United States Patent [19]
Menke et al.

[11] Patent Number: 5,841,744
[45] Date of Patent: Nov. 24, 1998

[54] DEVICE FOR PLAYING, RECORDING, AND ISSUING DISCS

[75] Inventors: Wilhelm Menke; Boerge Heidersberger; Ulrich Pitz, all of Bingen, Germany

[73] Assignee: NSM Aktiengesellschaft, Bingen, Germany

[21] Appl. No.: 737,786
[22] PCT Filed: May 19, 1995
[86] PCT No.: PCT/DE95/00688
  § 371 Date: Nov. 25, 1996
  § 102(e) Date: Nov. 25, 1996
[87] PCT Pub. No.: WO95/32502
  PCT Pub. Date: Nov. 30, 1995

[30] Foreign Application Priority Data
May 24, 1994 [DE] Germany .......................... 44 18 116.7

[51] Int. Cl.⁶ ............................. G11B 17/22; G11B 15/60
[52] U.S. Cl. ........................................... 369/36; 360/98.06
[58] Field of Search .................. 360/92, 98.04, 360/98.06; 369/34–39

[56] References Cited

U.S. PATENT DOCUMENTS

| | | | |
|---|---|---|---|
| 5,060,090 | 10/1991 | Kobayashi et al. | 360/92 |
| 5,128,912 | 7/1992 | Hug et al. | 369/38 |
| 5,228,016 | 7/1993 | Menke | 369/36 |
| 5,395,199 | 3/1995 | Day, III et al. | 360/92 |
| 5,414,679 | 5/1995 | Menke | 369/36 |
| 5,459,848 | 10/1995 | Mase | 369/34 |
| 5,532,931 | 7/1996 | Erickson, Jr. et al. | 369/34 |
| 5,539,712 | 7/1996 | Menke et al. | 369/36 |
| 5,546,366 | 8/1996 | Dang | 360/92 |
| 5,640,510 | 6/1997 | Hanaoka et al. | 369/34 |

FOREIGN PATENT DOCUMENTS

| | | |
|---|---|---|
| 0138005 | 4/1985 | European Pat. Off. |
| 0280263 | 8/1988 | European Pat. Off. |
| 0439483 | 8/1991 | European Pat. Off. |
| 0587124 | 3/1994 | European Pat. Off. |
| 4319551 | 12/1994 | Germany . |
| 90/04845 | 5/1990 | WIPO . |
| 92/13343 | 8/1992 | WIPO . |
| 93/11535 | 6/1993 | WIPO . |

Primary Examiner—Jefferson Evans
Attorney, Agent, or Firm—Spencer & Frank

[57] ABSTRACT

A transport device (10) conveys a disc holder (7) with a disc (1) between a disc magazine (4) and another disc magazine (4), between a disc magazine (4) and a running gear (5), or between a disc magazine (4) and a disc loading and issuing slide (11). Two horizontally movable extractor devices (9) on the transport device (10) travel simultaneously in opposite directions crossing each other between a ready position and a transport position. In the ready position, the extractor devices (9) are ready to engage a disc holder (7) from a disc magazine (4). In the transport position, the extractor devices (9) have traveled to their end positions on the transport device (10) and are ready to engage the disc holder (7) to transport the disc holder (7) to another disc magazine (4).

42 Claims, 23 Drawing Sheets

DEVICE FOR PLAYING, RECORDING, AND ISSUING DISCS

BACKGROUND

1. Field of the Invention

The invention relates to a playing and/or recording and/or issuing device for discs configured as information carriers, particularly Cds.

2. Related Art

EP 0 138 005 B1 discloses a disc-changing apparatus in which a vertically-traveling disc-extracting apparatus is disposed between two vertical disc magazines that store disc covers with discs; this disc-extracting apparatus supports a disc cover gripper, which travels horizontally on the apparatus. The disc cover gripper is provided with two gripping devices, of which one is alternatingly in its ready position in the left or right disc magazine, while the other gripping device holds an extracted disc cover in the center position, in which the disc is located above the turntable of the playback device. Accordingly, only one gripping device of the disc cover gripper can assume a ready position for extracting a disc cover from the associated disc magazine, that is, if a disc cover is to be extracted from the other disc magazine, the disc cover gripper must first be moved in the direction of this disc magazine in order to bring the other gripping device into a ready position for extracting a disc cover from its associated disc magazine, which represents an additional path of travel for the disc cover gripper that increases the transport time for conveying the disc cover containing the desired disc from the disc magazine to the turntable of the playback unit.

EP 0 280 263 A2 discloses a disc playback device in which the discs are arranged in two stacks and can be played in two playback stations. The individual discs can be played from two sides. They are not returned to the same stack after being played. This device includes an endless conveyor belt as an extraction device. With this conveyor belt, a disc can be extracted from one of the two magazines without a delay period. In this device, the position of the extraction device cannot be used to check the disc position. Consequently, unacceptable subtle disturbances in operations are anticipated to occur with the slightest irregularity in disc transport, for example the release of discs from the playback device or jarring of the system.

EP 0 439 483 B1 discloses a disc-playback device having two oppositely-located disc magazines and a transport device that can move in the direction of the disc magazine stack to convey a disc holder and a disc back and forth between the disc magazines and a playback unit; this device also has two extraction devices that can be controlled independently of one another and can travel horizontally on the transport device, and each extraction device has a gripper arm that can be extended or retracted. The independently-traveling extraction devices are respectively located in a ready position for extracting a disc holder for a disc from the associated disc magazine, or one extraction device is moved into a central position, in which it fixes the disc and disc holder that have been extracted from the disc magazine concentrically to the turntable, while the other extraction device remains in its ready position for the other disc magazine. The result of this design is a relatively short conveying path for an individual disc or associated disc holder; however, when a disc holder is transferred from one disc magazine to the other, the extraction device that has brought the disc holder into the central position must be returned to its ready position, and the other extraction device must be brought into the central position before it can convey the disc holder into the other magazine. This results in a corresponding loss of time.

Finally, WO-A-93/11 535 discloses a playing and/or recording device for discs configured as information carriers, the device encompassing two disc magazines for disc holders, a transport device having two horizontally-traveling extraction devices, a running gear and a disc loading and issuing slide. The extraction devices alternatingly in the ready position and the transport device position, respectively, can be brought into a position in which they engage the disc holder.

SUMMARY OF THE INVENTION

It is the object of the invention to create a playing and/or recording and/or issuing device, as described at the outset, for discs configured as information carriers, in which a simple and compact design assures extremely short travel paths for the extraction devices for all possible paths on which a disc holder and disc can be conveyed.

In accordance with the invention, this is accomplished by a playing and/or recording and/or issuing device for discs configured as information carriers, particularly CDs, having disc magazines that are located opposite one another and receive disc holders for at least one disc, the disc holders being located in receiving compartments disposed horizontally one above the other, a computer-controlled transport device, disposed between the disc magazines, for selectively conveying a single disc holder, with the disc, back and forth between arbitrary receiving compartments, between a receiving compartment and at least one running gear for reading out or inputting information from or onto the disc, respectively, or between a receiving compartment or running gear and a disc loading and issuing slide, and two extraction devices for the disc holders that travel horizontally on the transport device, and the extraction devices can travel simultaneously in opposite directions relative to one another, crossing each other between a ready position and a transport device position, and in the ready position, one extraction device is respectively positioned adjacently to a disc magazine, and the extraction devices can each be brought into an engaged position with respect to a disc holder for extracting the disc holder from the respective disc magazines, and in the transport device position, the two extraction devices are positioned adjacently to the disc magazine opposite the disc magazine they were adjacent to in the ready position, and the extraction devices can be brought into an engaged position with respect to the disc holder positioned in the transport device in order to transfer the disc holder from the transport device into the originally-adjacent disc magazine.

The device of the invention is provided with two independently-controlled extraction devices for the disc holder; these devices can execute a symmetrical movement in opposite directions, in a horizontal plane, between the ready position and the transport device position, i.e., the two extraction devices either assume the ready position or the transport device position as their end position, in which one or the other extraction device can be brought into engagement with the disc holder. With respect to path length and time, this arrangement provides for optimum transport, for every possible conveying path, of the disc holder and the disc inside the device. Moreover, the device is relatively small in size because of the independent control of the extraction devices.

For simple realization of the crossing movement of the extraction devices as they travel in opposite directions, in accordance with an advantageous embodiment of the invention, each extraction device has a sled that is guided to glide on a horizontal support rod and has an extendable and retractable gripper slide element for a disc holder; one sled is secured to the forward belt run, and the other sled is secured to the rear run, of a belt drive or the like coupled to a drive motor whose direction of rotation can be reversed.

To effect a rapid transfer of a disc holder from one disc magazine to the other, the following sequence of steps is preferably performed during the transfer of a disc holder from one disc magazine to the opposite disc magazine:

an extraction device associated with the disc magazines is brought into engagement with the disc holder, this first extraction device conveys the disc holder into the transport device, whereby, at the end of the transport movement, the first extraction device and the other, second extraction device assume the transport device position, in which they do not engage the disc holder, the second extraction device now conveys the disc holder out of the transport device and into the other disc magazine, whereby, at the end of the transport movement, the two extraction devices assume a ready position, in which they do not engage a disc holder of the associated disc magazine.

As an alternative, it is also possible to effect the following sequence of steps in transferring a disc holder from one disc magazine to the opposite disc magazine:

an extraction device associated with the disc magazines is brought into engagement with the disc holder, this first extraction device conveys the disc holder into the transport device, whereby, at the end of the transport movement, the first extraction device maintains its engaged position and the other, second extraction device assumes a transport device position, in which it does not engage the disc holder, the second extraction device is brought into engagement with the disc holder, the first extraction device is disengaged from the disc holder, and the second extraction device subsequently conveys the disc holder out of the transport device and into the other disc magazine, whereby, at the end of the transport movement, the two extraction devices assume a ready position, in which they do not engage a disc holder of the associated disc magazine. In this case, the disc holder is always in engagement with one of the extraction devices during the transfer process, practically precluding a loss of engagement due to a disturbance in the control during the transfer process.

To achieve a stable guidance per se of the transport device, in accordance with a further modification of the invention, the transport device is seated to glide on two parallel, vertically-extending guide rods, and can be moved up and down by way of a belt drive, whose drive motor is reversible in its direction of rotation. Of course, a cable-drawn drive, spindle drive or the like can be used instead of the belt drive. A sensor for determining the lower initial position of the transport device is advisably associated with the transport device. A sensor for monitoring the actual presence of a disc in the disc holder located in the transport device is also preferably associated with the transport device.

To achieve a structurally simple drive for moving the sleds of the extraction device in opposite directions, in accordance with an embodiment of the invention, one of the guide rods of the transport device is rotatably seated, and is connected by way of a gear, which is fixed against relative rotation and is displaceable on the rod, to the toothed belt of the belt drive coupled to the sleds in order to convert the rotational movement of the rod into a displacement movement of the sleds; the rod is also connected by way of a further belt drive to the drive motor for the sleds. To check the position of the extraction devices on the transport device, the rotatable guide rod is preferably connected by way of a further belt drive to a rotatable encoding disk that cooperates with sensors that generate position pulses to determine the position of the extraction device. At least two sensors are associated with the encoding disk for determining the ready position and the transport device position of the extraction devices.

In a particularly advantageous embodiment of the extraction devices, a reversible sliding control element is associated with the gripper slide elements of the sleds such that, during a movement of the sleds in opposite directions from the ready position, in which the gripper slide elements, in their retracted position, are respectively located opposite a recess of a disc holder in the opposite disc magazine, or from the transport device position, in which the gripper slide elements, in their retracted position, are respectively located opposite a recess in a disc holder conveyed into the transport device, the gripper slide element of one or the other sled is alternatingly forced to be transferred into a position of engagement with the disc holder. The result is reliable actuation of the gripper slide elements.

So that the gripper slide elements can meet in one plane, in accordance with a modification of the subject of the invention, the gripper slide elements are bent at opposite right angles in their forward region such that, during a crossing movement of the sleds in opposite directions, in which one gripper slide element is always in the extended position and the other gripper slide element is in the retracted position, the forward regions of the gripper arms pass each other in one plane, and can be brought into engagement with the disc holder in the same plane. Each sled advisably extends, with a projecting catch, into a guide groove, which is configured in an inserted part of a chassis disposed in the housing of the transport device; the oppositely-located grooves define the same plane of the gripper slide elements.

For a reliable back-and-forth movement of the sleds and, simultaneously, a reliable extension and retraction movement of the gripper slide elements, in a further embodiment of the invention, a sled is respectively seated on one of two support rods superposed in one plane, and a trunnion guided to glide in an oblong hole of the associated sled is secured to the end side of the gripper slide elements of the upper and lower sleds; the trunnion of the gripper slide element of the upper sled cooperates with an adjustable, upper guide bar and ramps disposed stationarily at the end of the bar, and the trunnion of the gripper slide element of the lower sled cooperates with an adjustable, lower guide bar and ramps disposed stationarily at the end of the bar. The ramp associated with the right side of the upper guide bar preferably determines the ready position of the gripper slide element of the upper sled for extracting a disc holder from the right disc magazine, and the ramp associated with the left side of the lower guide bar preferably determines the ready position of the gripper slide element of the lower sled for extracting a disc holder from the left disc magazine. Analogously, the ramp associated with the left side of the upper guide bar determines the transport device position of a disc holder that has been moved out of right disc magazine in the transport device, and the ramp associated with the right side of the lower guide bar determines the transport device position of a disc holder that has been moved out of the left disc magazine in the transport device.

To achieve a reliable adjustment of the guide bars with respect to each other corresponding to the requirements for actuating the gripper slide elements, according to an advantageous modification of the invention, the upper and lower guide bars can be moved simultaneously and parallel to each other by way of a driven lever rod assembly in such a way that either the upper or lower guide bar opens throughgoing slots between the bar and the associated ramps for the trunnion of the gripper slide element of the upper or lower sled, respectively.

In accordance with a further embodiment of the invention, the lever rod assembly connected to the guide bars encompasses an upper lever drive connected to the upper guide bar, and a lower lever drive connected to the lower guide bar, both of which are connected to a common switching lever such that the guide bars execute a limited, parallel movement in opposite directions when the switching lever is actuated.

The throughgoing slots are preferably configured to transfer the gripper arm into an engaged position or a non-engaged position with respect to the disc holder by correspondingly guiding the trunnion of the gripper arm of the associated sled as a function of the direction of movement of the belt drive of the sleds.

Moreover, in the engaged position of the gripper slide element of the upper sled, the trunnion of the gripper slide preferably glides on the inside of the upper guide bar during a movement of the belt drive of the sleds and, at the same time, the trunnion of the gripper slide element of the lower sled, which element is not in the engaged position, glides along the outside of the lower guide bar. As an alternative, in the engaged position of the gripper slide element of the lower sled, the trunnion of the gripper slide element glides on the inside of the lower guide bar during a movement of the belt drive of the sleds and, at the same time, the trunnion of the gripper slide element of the upper sled, which element is not in the engaged position, glides along the outside of the upper guide bar.

For simple actuation of the switching lever, according to a modification of the subject of the invention, the switching lever is disposed to be fixed against relative rotation and displaceable on the other, also rotatably-seated guide rod of the transport device, which rod can be acted upon by way of an electromagnet and a restoring spring that cooperate with a clamping ring disposed to be fixed against relative rotation on the guide rod, or the guide rod can be acted upon in different directions of rotation by a drive motor whose direction of rotation can be reversed. Sensors for monitoring the end positions in the direction of rotation of the guide rod that receives the switching lever are advisably associated with the guide rod.

It is also preferably provided that the housing of the transport device has a bracket; a guide rail for the disc holder is configured in the inserted parts of the metal chassis disposed in the housing, the parts comprising sliding plastic, and a further guide rail for the disc holder, the rail comprising sliding plastic, is located opposite the first guide rail on the outside of the bracket. To fix a disc holder securely in the transport device, a spring element is advisably associated with the center of the outside guide rail of the bracket; this spring element centers the disc holder in the transport device by latching in a corresponding notch of the disc holder.

To be able to actuate the transport device without electrical actuators, towing cables or the like, the actuation of the control mechanisms for the sleds and the gripper slide elements, the mechanisms being located in the transport device, is effected inside the transport device without electrical drive elements.

To prevent the disc holder from falling out of the disc magazine in a possible pivoted position of the disc magazine, for example during transport of the magazine, in an advantageous embodiment of the solution according to the invention, each disc holder is positioned securely in the receiving compartment by two oppositely-located spring elements attached to the disc magazine; in this position, the disc holder can be grasped by the associated extraction device of the transport device by way of a corresponding opening in the side wall of the associated disc magazine. To increase the secure positioning of the discs in the disc holders inside the disc magazines, it is advisably provided that the free space between the disc holders in each disc magazine is smaller than the thickness of a disc. This practically precludes the possibility that the discs will slide out of the disc holders. To obtain a compact disc magazine, the thickness of each disc holder is preferably only slightly greater than the thickness of a disc.

So that the disc holder can be grasped easily by the extraction devices of the transport device, in accordance with an advantageous embodiment of the invention, the disc holder has a recess in the forward region of each longitudinal side and, corresponding to the position of the disc holder in the receiving compartment of the respective disc magazine or in the transport device, the gripper arm of the corresponding extraction device can be brought into engagement with one of these recesses. Furthermore, notches that align with the corresponding recesses in the disc holder in the disc magazine are preferably provided in the bottom wall and top wall of each disc magazine. This permits the gripper slide elements of the associated extraction device to travel vertically through a plurality of superposed disc magazines.

To permit consecutive playback of discs without pauses, as is required in discotheques, for example, or access by a plurality of users to the discs, which can also be configured as CD-ROM discs, a plurality of running gears is superposed to be exchangeable in the vertical axis of one of the disc magazines. It is also possible to dispose a running gear beneath the transport device or a running gear above the transport device, and a plurality of running gears in the vertical axis of one of the disc magazines. One of the oppositely-located disc magazines can also be completely replaced by a tower of superposed running gears. In this instance, a further running gear can be disposed beneath the transport device.

In accordance with another advantageous modification of the subject of the invention, the disc loading and issuing slide is disposed to be exchangeable in the vertical axis of one of the disc magazines, and an insertion and ejection shaft for a disc holder with a disc is associated with the slide; either the disc holder with the disc is conveyed by way of the transport device to one of the running gears or a free receiving compartment via the disc loading and issuing slide, or a disc located in a disc magazine can be exchanged for another disc. The disc holder is usefully compelled to remain in the disc loading and issuing slide while a disc is being issued or exchanged for another disc by the disc loading and issuing slide while it is in its extended position.

For user-friendly handling of a disc holder containing a disc outside of the device, in accordance with a modification of the invention, the disc holder and the disc are disposed inside a cassette inserted into a correspondingly enlarged receiving compartment of the disc magazine. As an alternative, it is also possible to accommodate a plurality of disc holders and their respective discs inside a cassette, which is then inserted into a correspondingly enlarged receiving compartment of the disc magazine.

To permit quick and easy access to the computer on the device, in an embodiment of the invention an intermediate memory is associated with the internal computer unit, and an external computer is provided, with the internal computer unit controlling and monitoring the device, managing the intermediate memory and effecting communication with the external computer.

For the purpose of creating an extremely compact, simply-constructed device, only one disc magazine is associated with one side of the transport device, and one running gear is disposed either in the vertical axis of this disc magazine or beneath the transport device, with only one extraction device that can travel horizontally on the transport device being disposed on the transport device. This significantly simplifies the control mechanism for the extraction device. Alternatively, it is also possible for a plurality of superposed disc magazines, a plurality of superposed running gears and a disc loading and issuing slide to be associated with one side of the transport device.

BRIEF DESCRIPTION OF THE DRAWINGS

The concept underlying the invention is described in detail in the following description by way of an embodiment illustrated in the drawing figures. Shown are in.

DESCRIPTION OF THE PREFERRED EMBODIMENTS

Figure 1:
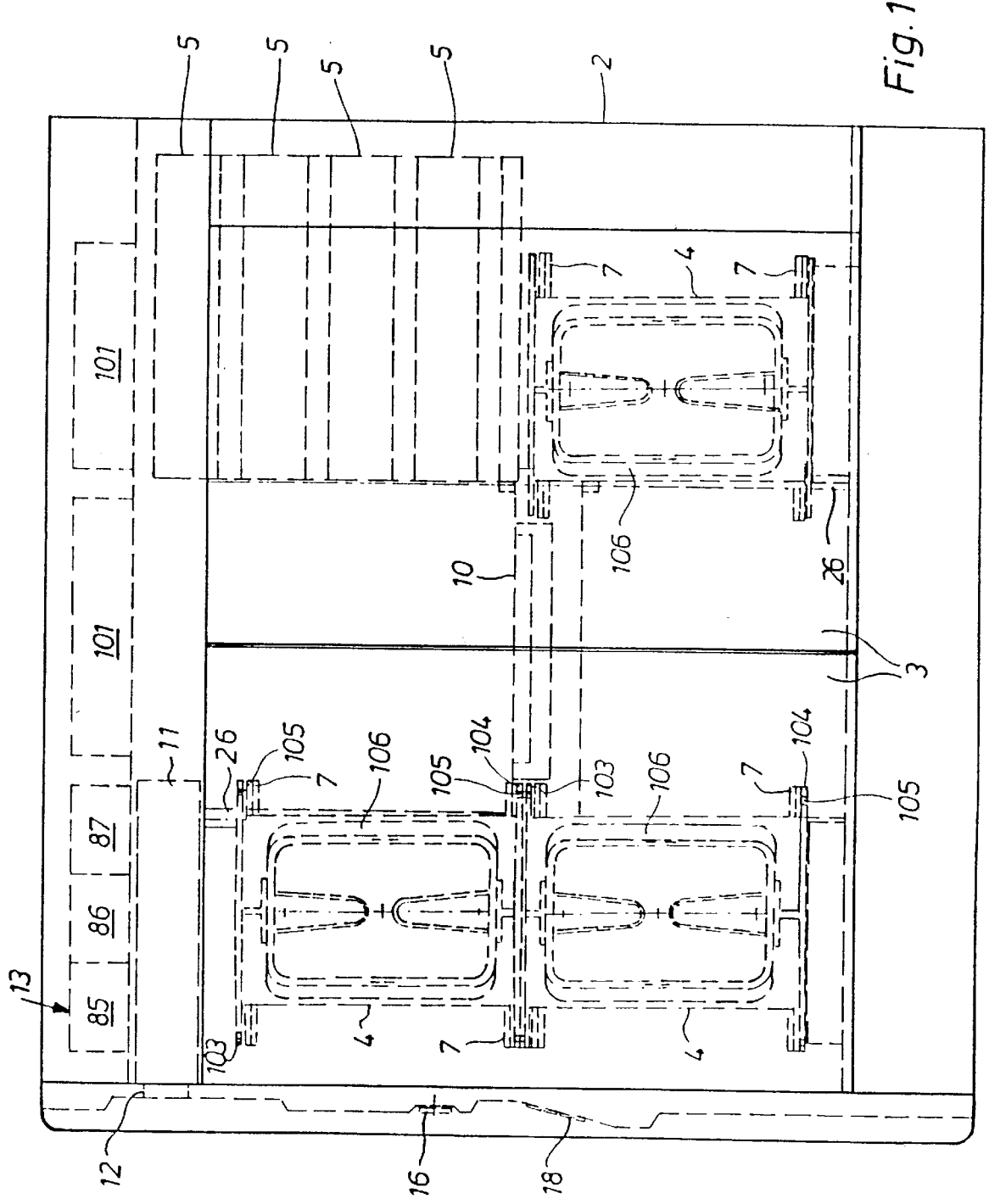
FIG. 1 a front view of a playing, recording and issuing device for discs according to the invention, FIG. 2 a side view of the device according to FIG. 1, FIGS. 3a through 3c respectively, a cross-section through the device of FIG. 1 showing different functional positions of the extraction devices of the transport device for a disc holder, FIG. 4 a partially-cutaway view from below of the device of FIG. 1, FIG. 4a an alternative embodiment of the illustration of FIG. 4, FIG. 5 a rear view of the transport device from the illustration of FIG. 3a, but with the extraction devices in a different functional position, FIG. 6 a section through the illustration of FIG. 5, along line VI—VI, but with a different functional position, FIG. 7 a section through the illustration of FIG. 5, along line VII—VII, but with the extraction devices in a different functional position, FIG. 8 a section through the illustration of FIG. 7, along line VIII—VIII, FIG. 9 a section through the illustration of FIG. 7, along line IX—IX, FIGS. 10a through 10g fundamental representations of the functional positions of the extraction devices of the transport devices during a transfer of a disc holder, with a disc, from the right disc magazine to the left disc magazine, FIGS. 11a through 11e fundamental representations of alternative functional positions of the extraction devices of the transport device during an exchange of a disc holder, with a disc, from the right disc magazine to the left disc magazine, FIG. 12 an enlarged partial section through a disc magazine of FIG. 1, FIGS. 13 through 15 alternative embodiments of the device of FIG. 1, FIG. 16 a front view of a cassette which receives a disc holder with an inserted disc, FIG. 17 a front view of a cassette which receives a plurality of disc holders, each with an inserted disc, FIG. 18 a circuit diagram for the control of the device of FIG. 1, FIG. 19 an alternative embodiment of the device of FIG. 1 in which only one disc magazine is associated laterally with the transport device and one running gear is attached beneath the transport device, and FIGS. 20 and 21 alternative embodiments of the representation of FIG. 19.

The playing, recording and issuing device for discs 1 includes a housing 2 having a double door 3 attached to the front side (FIG. 1). Two oppositely-located disc magazines 4 are disposed to the side in the lower region of the housing 2. A further, exchangeable disc magazine 4 is located above the left disc magazine 4, while a tower comprising four exchangeable running gears 5 is provided above the right disc magazine 4. The running gears 5 serve to read out or write information from or onto a disc 1, respectively. The running gears 5 can include, for example, a drive mechanism with components such as a turnable and a transducer.

Figure 2:
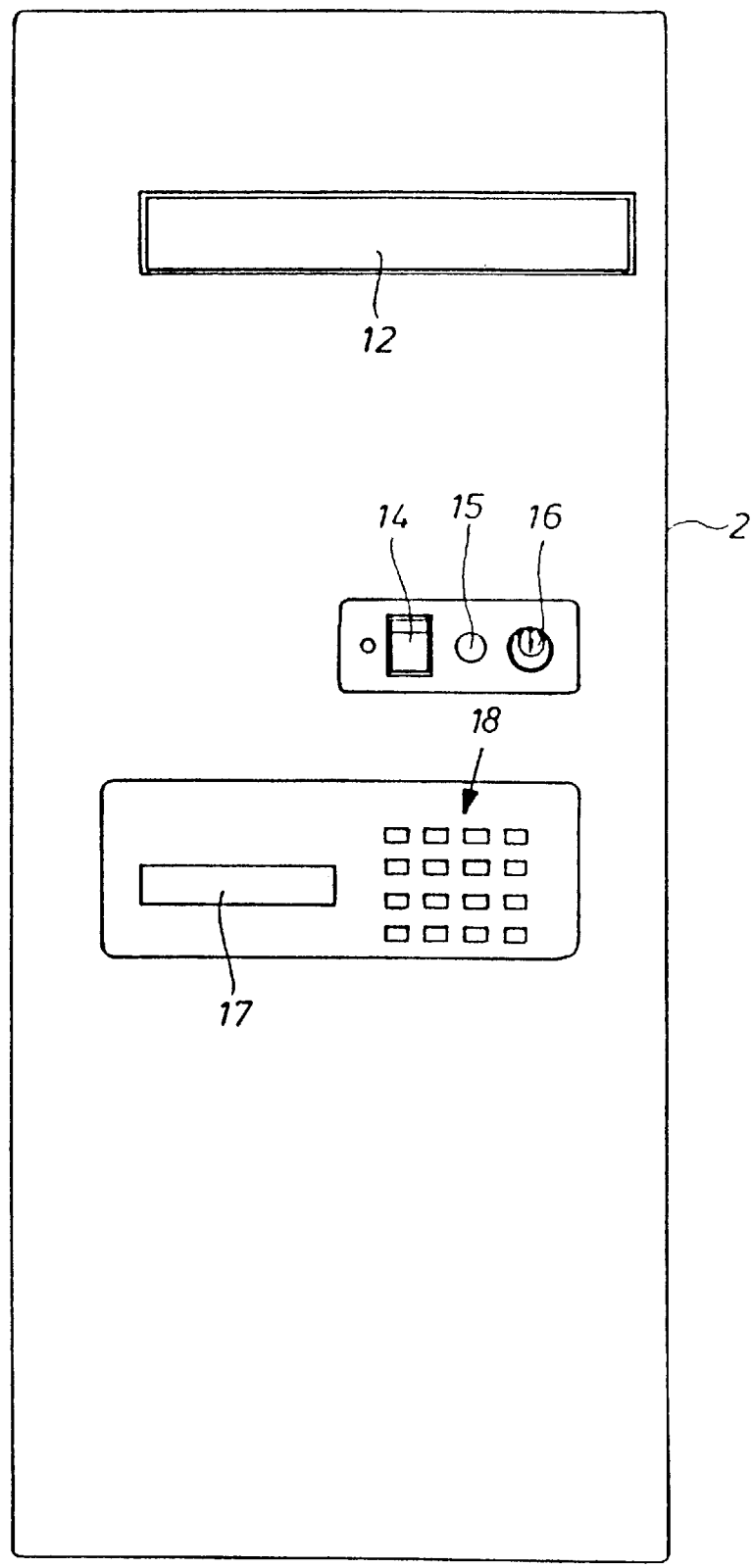
Figure 12:
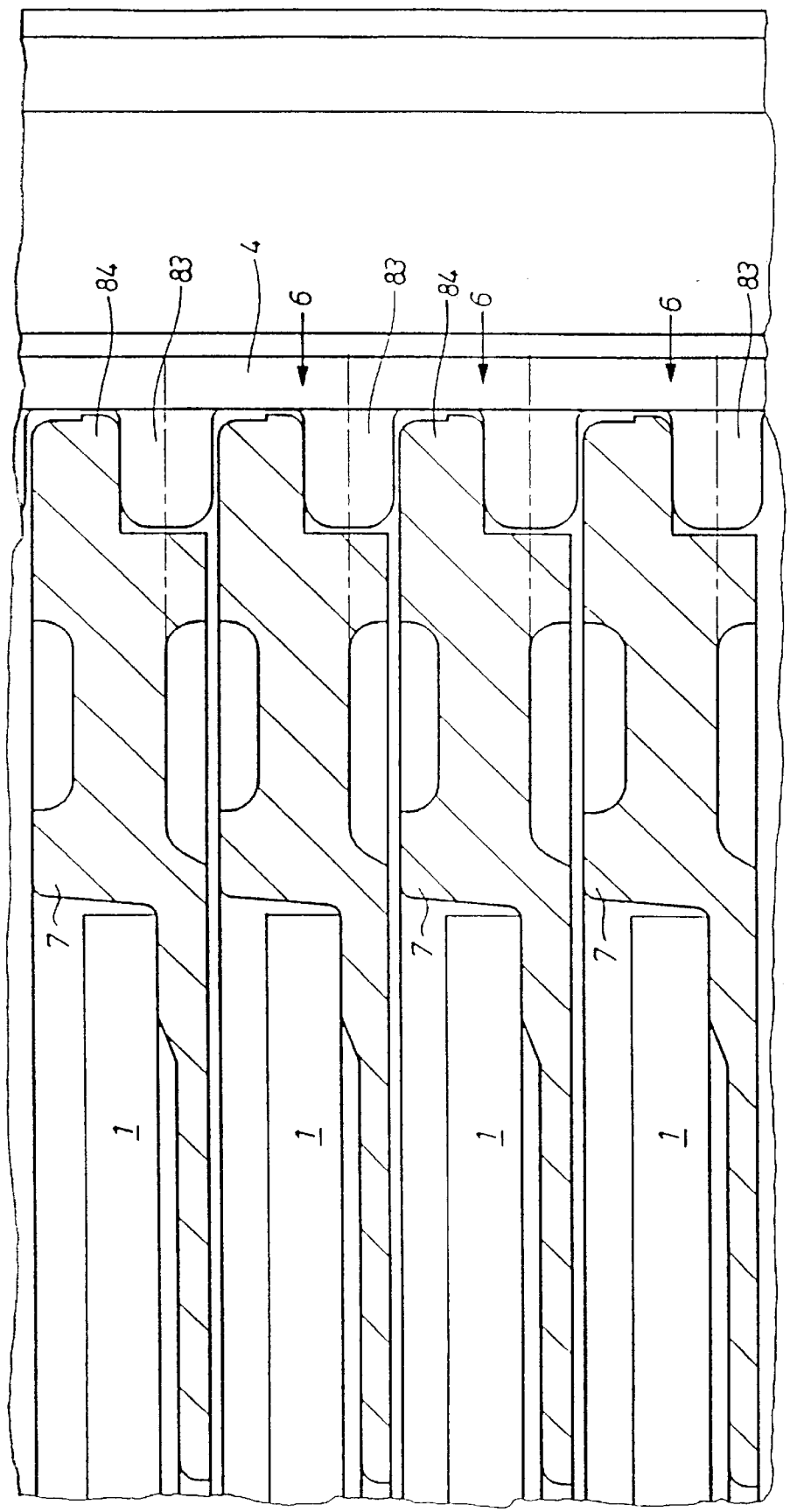

The disc magazines 4, which are all of identical construction, each include a plurality of superposed receiving compartments 6 for storing a corresponding number of disc holders 7 that each receive a disc 1. Associated with each receiving compartment 6 are two oppositely-located sliding rails 83, on which the disc holder 7 rests with shoulders 84 provided at its edge (FIG. 12). The free space between the disc holders 7 is smaller than the thickness of the disc 1 inserted into the disc holder 7. Furthermore, the thickness of the disc holder 7 is only slightly greater than the thickness of the disc 1. The disc 1 has a thickness of approximately 1.2 mm, and the disc holder 7 has a thickness of approximately 2.8 mm. Consequently, a very low height is achieved for a disc magazine 4 containing fifty vertically-stacked disc holders 7. The disc holder 7 is secured in its position in the receiving compartment 6 by two spring elements 8 attached to opposite sides of the disc magazine 4. In this position, through the opening of the corresponding side wall of the disc magazine 4, the disc holder 7 protrudes so far beyond the withdrawal side of the disc magazine 4 that it can be grasped by one of the two extraction devices 9 of a transport device 10 that can travel up and down in the space between the disc magazines 4 and the running gears 5 for the disc holder 7 containing a disc 1. Disposed above the two left disc magazines 4 is a disc loading and issuing slide 11, which is allocated a lateral insertion and ejection shaft 12 for a disc holder 7 with a disc 1 and can also be serviced by the transport device 10 (FIG. 1). When the disc loading and issuing slide is in its extended position, the disc holder 7 is compelled to remain in the slide 11, i.e., when a disc 1 is inserted into or extracted from the slide 11, the disc holder 7 cannot be extracted from the slide. All of the device functions are controlled by an internal computer unit 13 disposed above the disc loading and issuing slide 11 and connected to an on/off switch 14, a door-opener 15, a key-operated switch 16, a display 17 and an operating keypad 18 (FIG. 2).

Figure 18:
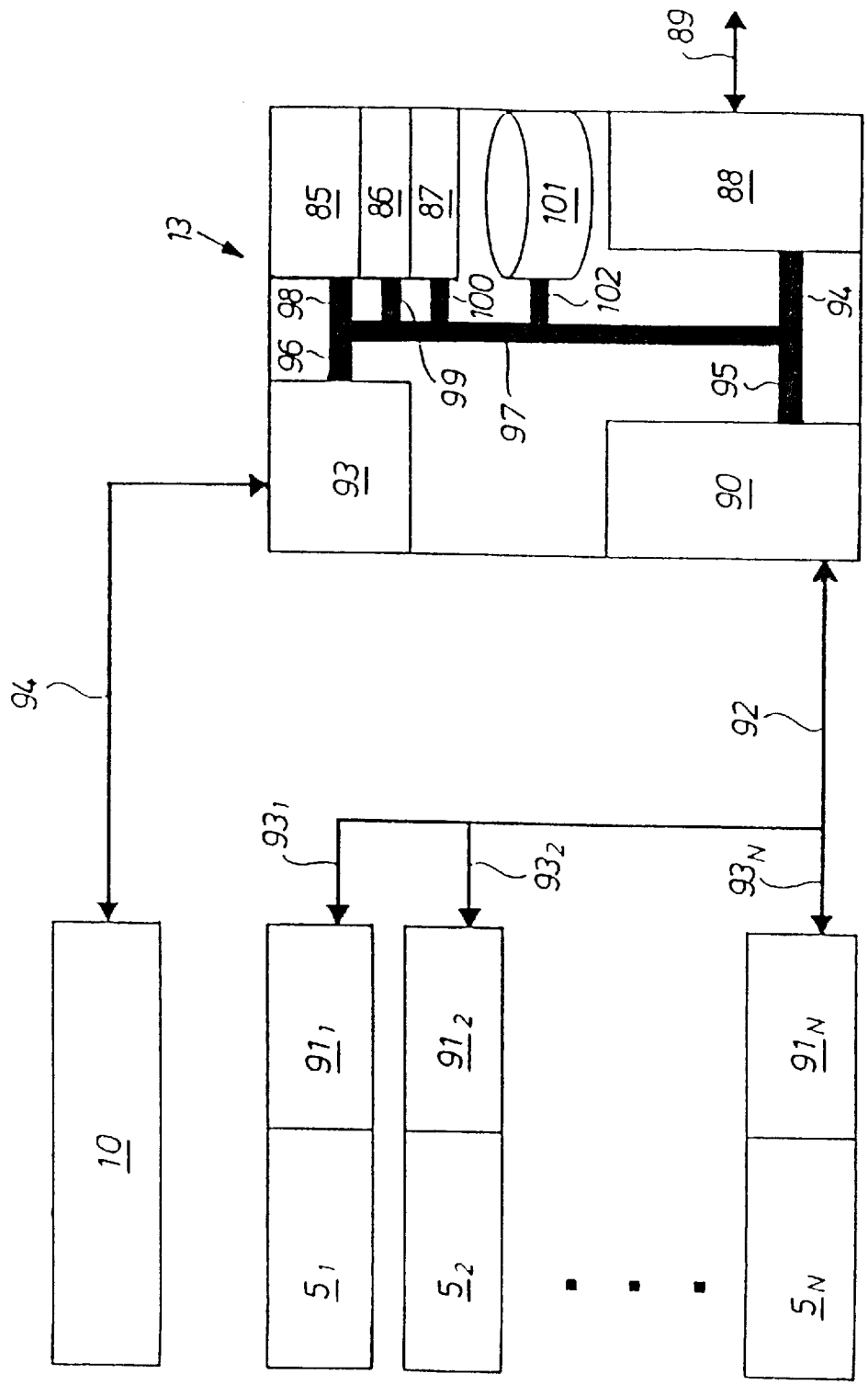

The internal computer 13 encompasses a central unit 85, a BIOS unit 86, a RAM 87 and an interface 88 to form an external computer, not shown, with which the internal computer 13 communicates, as indicated by the double-headed arrow 89 (FIG. 1). A further interface 90 (FIG. 18) is provided for connection to a plurality of running gears $5_1$, $5_2, \ldots 5_N$ having respective interfaces $91_1, 91_2, \ldots 91_N$. The interface 90 is connected to the interfaces $91_1, 91_2, \ldots 91_N$ via a line 92 and branch lines $93_1, 93_2, \ldots 93_N$. The internal computer 13 also encompasses a further interface 93, by way of which it is connected to the transport device 10 via a line 94.

The interfaces 88, 90, 93 of the internal computer 13 are connected to the central unit 85, the BIOS unit 86 and the RAM 87 by way of lines 94, 96, a line 97 and lines 98, 99, 100. An intermediate memory 101, which is connected to the corresponding units of the internal computer 13 by way of a line 102, is integrated with the internal computer 13. The intermediate memory 101 can be configured as a hard disk or a CD-ROM. The internal computer 13 controls and monitors the entire device and effects communication with the external computer. It also manages the intermediate memory 101. Toward the outside, the number of running gears $5_1, 5_2, \ldots 5_n$ for the external computer is represented as a single running gear having a large, but cohesive, directory. For access to the individual discs 1, the software of the external computer must merely branch into a different directory. The operating functions, such as disc changing, data retrieval, etc., are performed by the internal computer 13, and employ the transport device 10.

Figure 3A:
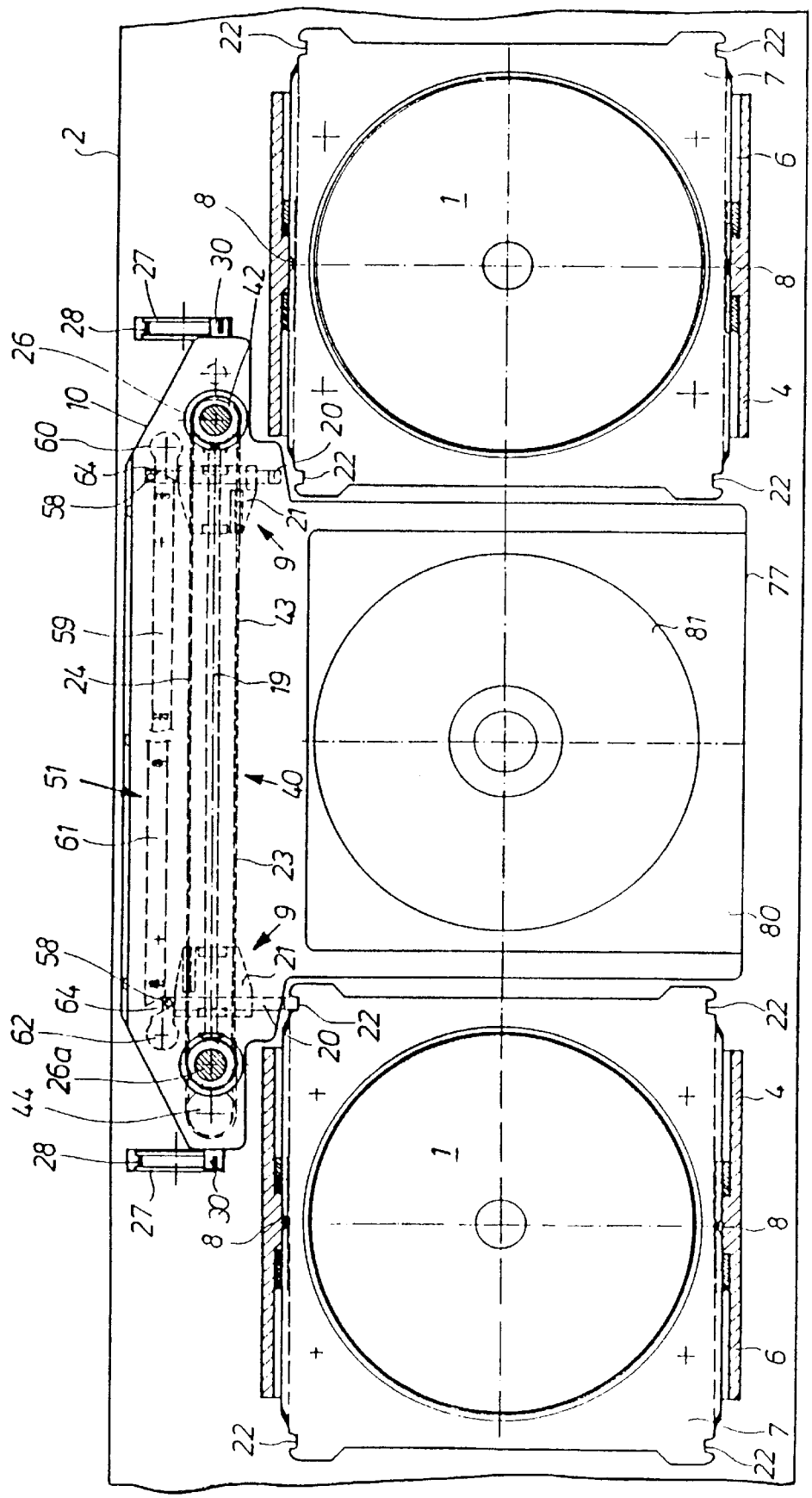
Figure 3B:
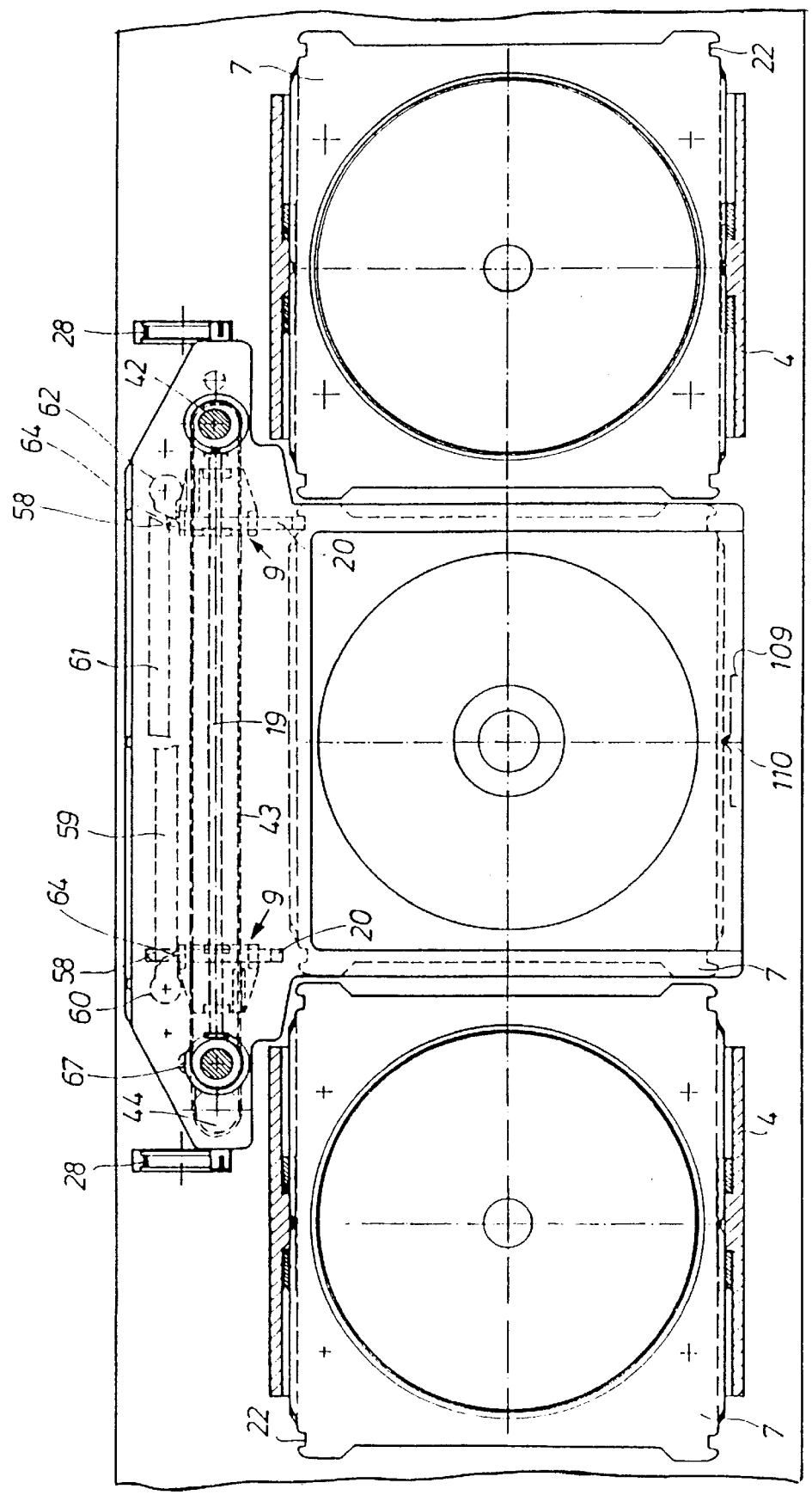
Figure 3C:
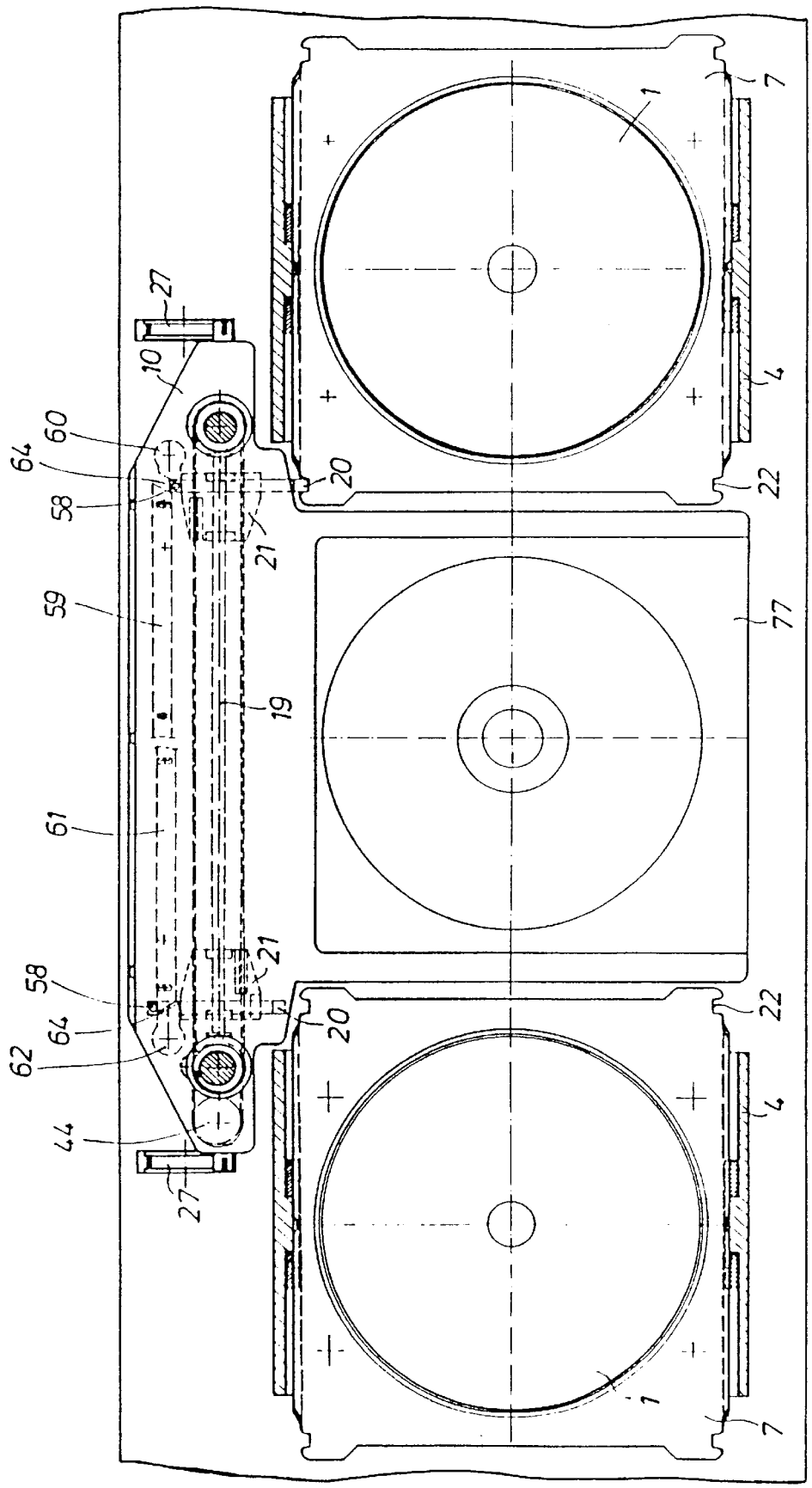

The two extraction devices 9 that travel horizontally on the transport device 10 can simultaneously cross in opposite directions between a ready position for extracting a specific disc holder 7, with the desired disc 1, from the corresponding disc magazine 4 or the corresponding running gear 5 or the disc loading and issuing slide 11, and a transport device position for extracting the disc holder 7 from the transport device 10 (FIGS. 3a–3c). Neither extraction device 9 engages the disc holder 7 in either the ready position or the transport device position. In these positions, the extraction devices 9 can, however, be alternatingly brought into an engaged position with the disc holder 7. Each extraction device 9 encompasses a sled 21 that is guided to glide on a horizontal support rod 19 and is provided with an extendable and retractable gripper slide element 20 for a disc holder 7. The disc holder 7 has a recess 22 in the forward region of each longitudinal side; corresponding to the position of the disc holder 7 in the receiving compartment 6 of the respective disc magazine 4 or in the transport device 10, the gripper slide element 20 of the corresponding sled 21 can extend into one of these recesses. Notches 105 that align with the corresponding recesses 22 in the disc holders 7 in the disc magazine 4 are preferably cut into the bottom wall 104 and top wall 103 of each disc magazine 4 (FIG. 1). The sled 21 associated with the right disc magazine 4 is secured to the forward run 23, and the sled 21 associated with the left disc magazine 4 is secured to the rear run 24, of a belt drive coupled to a drive motor 25 whose direction of rotation can be reversed (FIG. 3a). Each disc magazine 4 is provided on its front side with a support yoke 106 (FIG. 1).

Figure 4:
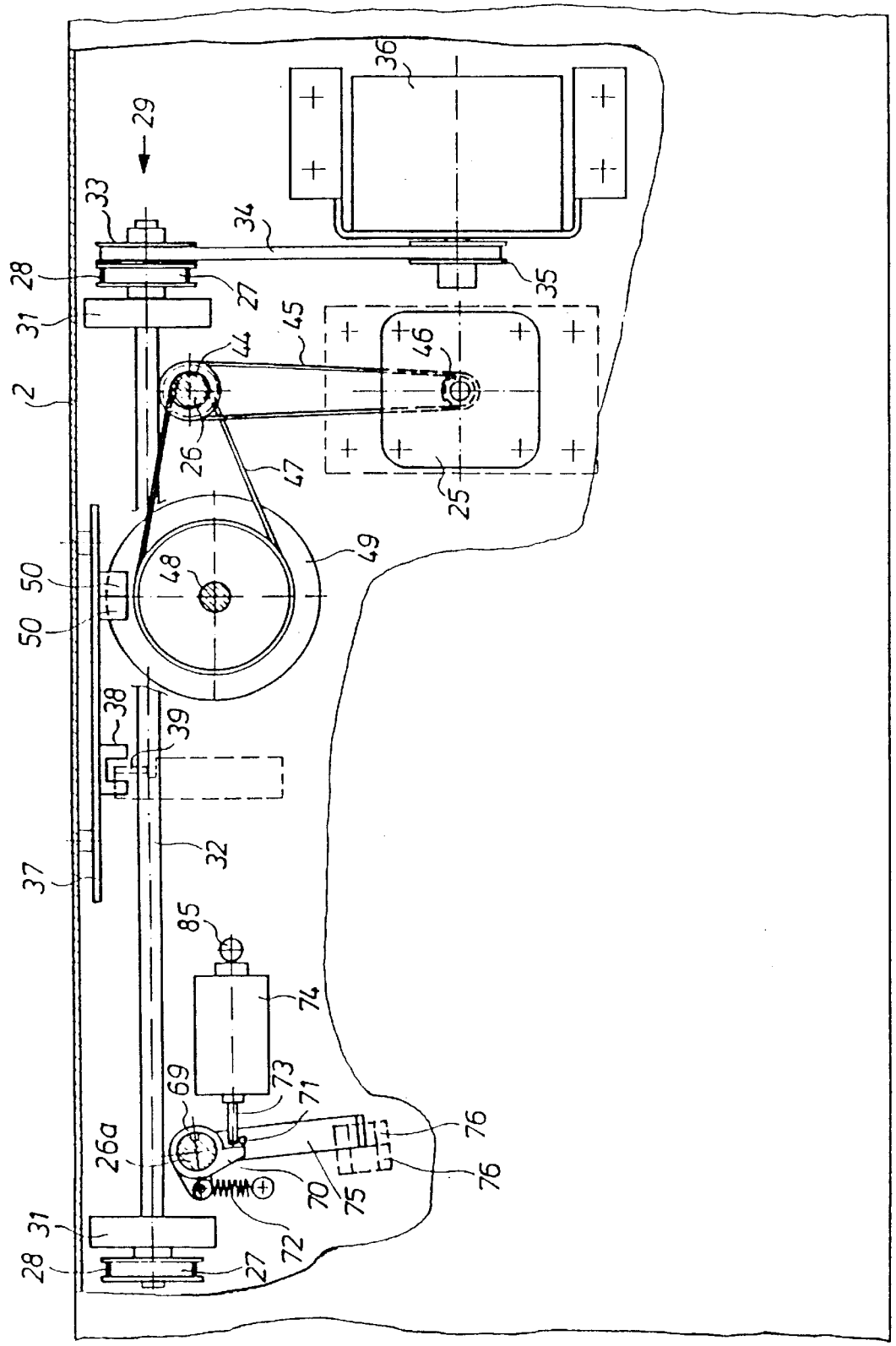
Figure 6:
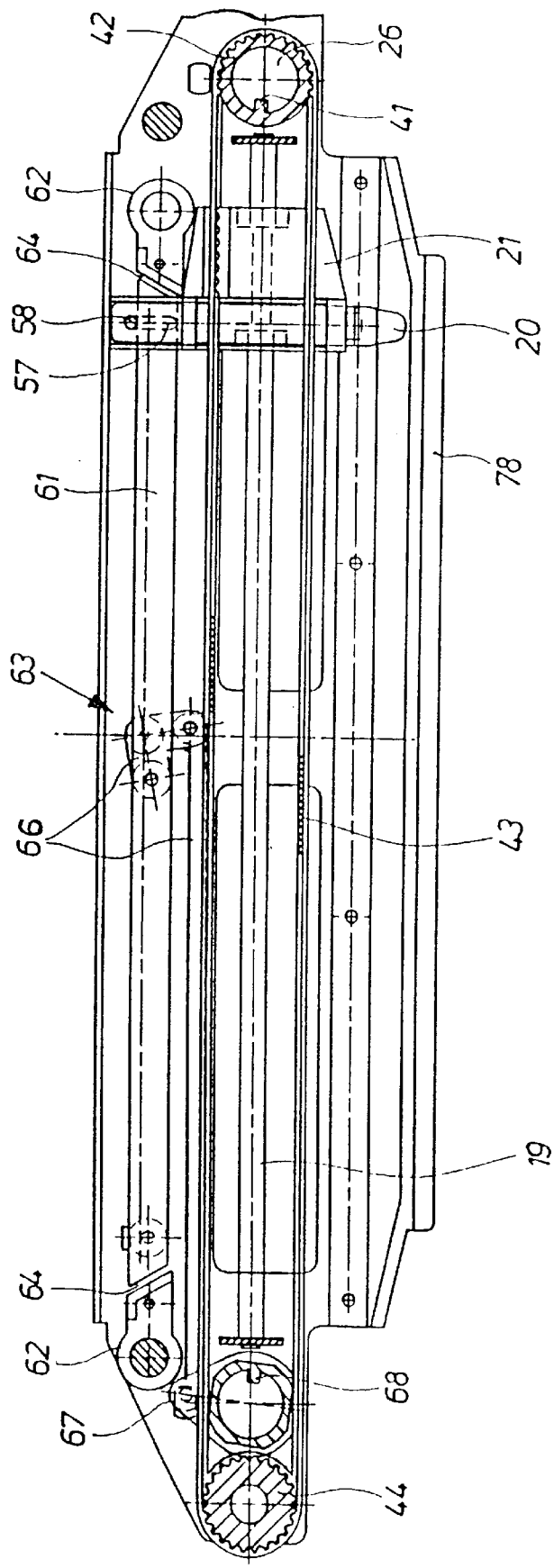

Disposed in the rear region of the housing 2 are two guide rods 26 and 26a, which extend parallel to one another and vertically, and on which the transport device 10 is seated to glide (FIG. 3a and 4). A belt 28 of a belt drive 29 is associated laterally with each guide rod 26, 26a; the belt extends parallel to the guide rod and is guided via deflecting rollers 27, and each is connected to the transport device 10 by way of a clamping holder 30. The lower deflecting rollers 27 are coupled with one another by a shaft 32 received in bearings 31. The shaft 32 supports a further deflecting roller 33 for a belt 34 connected to the drive wheel 35 of a drive motor 36 whose direction of rotation can be reversed. To determine the lower initial position of the transport device 10, a sensor 38 disposed on a printed circuit board 37 and configured as a forked coupler is associated with the transport device; in the lower position of the transport device 10, a rib 39 extends into the underside of this sensor. The two guide rods 26, 26a of the transport device 10 are seated to rotate. A gear 42 is seated to be displaceable and fixed against relative rotation on the right guide rod 26 by means of a groove-spring guide 41, and is connected to the toothed belt 43 of the belt drive 40 coupled to the sleds 21 (FIG. 6). A gear 44 serving as a deflecting roller for the toothed belts 43 is stationarily seated opposite the gear 42 on the transport device 10. At its lower end, the right guide rod 26 supports a gear 44, which is fixed against relative rotation, for a further belt drive 45 that cooperates with the drive wheel 46 of the drive motor 25 having a reversible direction of rotation (FIG. 4). The lower end of the right guide rod 26 is connected by way of a further belt drive 47 to an encoding disk 49 seated on a shaft 48; this disk is allocated two sensors 50 configured as forked couplers and secured on the printed circuit board 37. These position-pulse-generating sensors 50 are used to monitor the ready position and the transport device position of the sleds 21.

The extension and retraction movement of the gripper slide elements 20 of the sleds 21 is controlled by way of a reversible sliding control element 51 (FIG. 3a). The sliding control element 51 is designed such that, when the sleds 21 execute a movement in opposite directions out of the ready position or out of the transport device position, the gripper slide element 20 of the right or left sled 21 is alternatingly forced into the position of engagement with the disc holder 7. The gripper slide elements 20 are bent at opposite right angles in their forward region. Because of this shaping, when the sleds 21 execute a crossing movement in opposite directions, during which one gripper slide element 20 is always in the extended position due to the sliding control element 51, the forward regions of the gripper slide elements 20 can pass one another in one plane, that is, the forward region of an extended gripper slide element 20 transports a disc holder 7, while the forward region of the other, retracted gripper slide element 20 moves in the opposite direction behind the forward region of the extended gripper slide element 20. Each sled 21 seated on one of two support rods 19 superposed in one plane extends in a gliding manner, with a catch 52 projecting from its front side, into a stationary guide groove 53 respectively configured in an inserted part 54 of a chassis 56 disposed in the housing 55 of the transport device 10 (FIG. 9). A trunnion 58 guided to glide in an oblong slot 57 of the associated sled 21 is secured to the end side of the gripper slide elements 20 of the sleds 21 to limit the extension and retraction movement of the gripper slide element 20 (FIGS. 5–9). The trunnion 58 of the gripper slide element 20 of the upper sled 21 cooperates with an adjustable, upper guide bar 59 and ramps 60 disposed stationarily at the end of the bar. In an analogous manner, the trunnion 58 of the gripper slide element 20 of the lower sled 21 is in operative connection with an adjustable, lower guide bar 61 and ramps 62 disposed stationarily at the end of the bar. The ramp 60 associated with the right side of the upper guide bar 59 determines the ready position of the gripper slide element 20 of the upper sled 21 for extracting a disc holder 7 from the right disc magazine 4. Correspondingly, the ramp 62 associated with the left side of the lower guide bar 61 determines the ready position of the gripper slide element 20 of the lower sled 21 for extracting a disc holder 7 from the left disc magazine 4. Analogously, the ramp 60 associated with the left side of the upper guide bar 59 determines the transport device position of a disc holder 4 that has been moved out of the right disc magazine 4 in the transport device 10, and the ramp 62 associated with the right side of the lower guide bar 61 determines the transport device position of a disc holder 7 that has been moved out of the left disc magazine 4 in the transport device 10.

The two guide bars 59, 61 can simultaneously travel parallel to one another from one end position into the other by way of a driven lever rod assembly 63, whereby either the upper or lower guide bar 59 or 61 opens throughgoing slots 64 between the bar and the associated ramps 60 or 62 for the trunnion 58 of the upper or lower sled 21, respectively, that is, when the throughgoing slots 64 associated with the upper guide bar 59 are open, the throughgoing slots 64 associated with the lower guide bar 61 are closed, or vice versa (FIGS. 3a–3c). The throughgoing slots 64 are configured to transfer the gripper arm 20 of the associated sled 21 into an engaged position or a non-engaged position with the disc holder 7 by correspondingly guiding the trunnion 58 of the gripper arm 20 of the associated sled 21 as a function of the direction of movement of the belt drive 40 of the sleds 21. In the engaged position of the gripper slide element 20 of the upper sled 21, the trunnion 58 of this gripper slide element 20 glides on the inside of the upper guide bar 59 and, at the same time, in the non-engaged position of the gripper slide element 21 of the lower sled 21, the trunnion 58 of this gripper slide element 20 glides along the outside of the lower guide bar 61. Correspondingly, in the engaged position of the gripper slide element 20 of the lower sled 21, the trunnion 58 of this gripper slide element 20 glides on the inside of the lower guide bar 61 during a movement of the belt drive 40 of the sleds 21 and, at the same time, in the non-engaged position of the gripper slide element 20 of the upper sled 21, the trunnion 58 of this gripper slide element 20 glides along the outside of the upper guide bar 59.

Figure 4A:
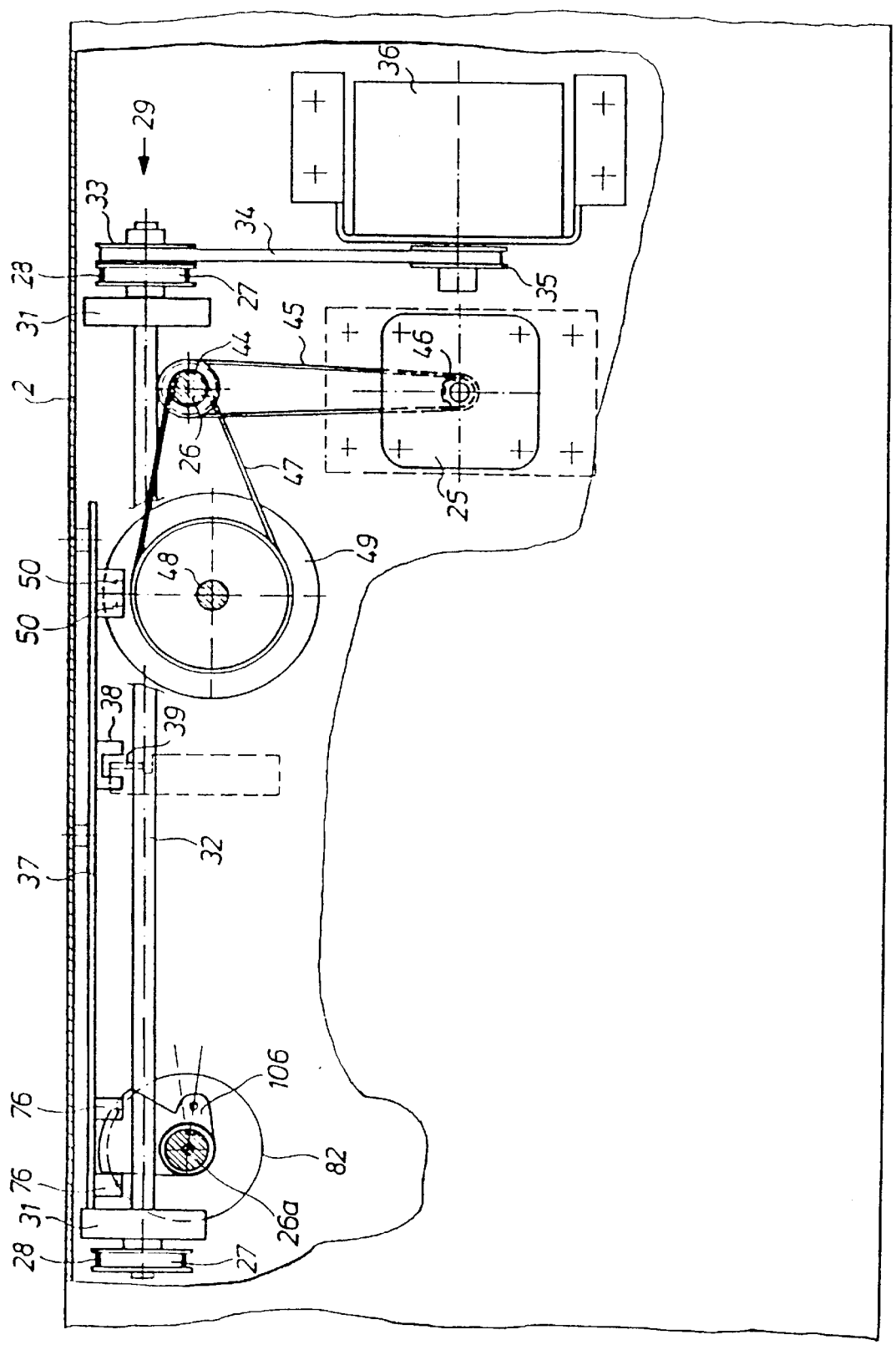
Figure 5:
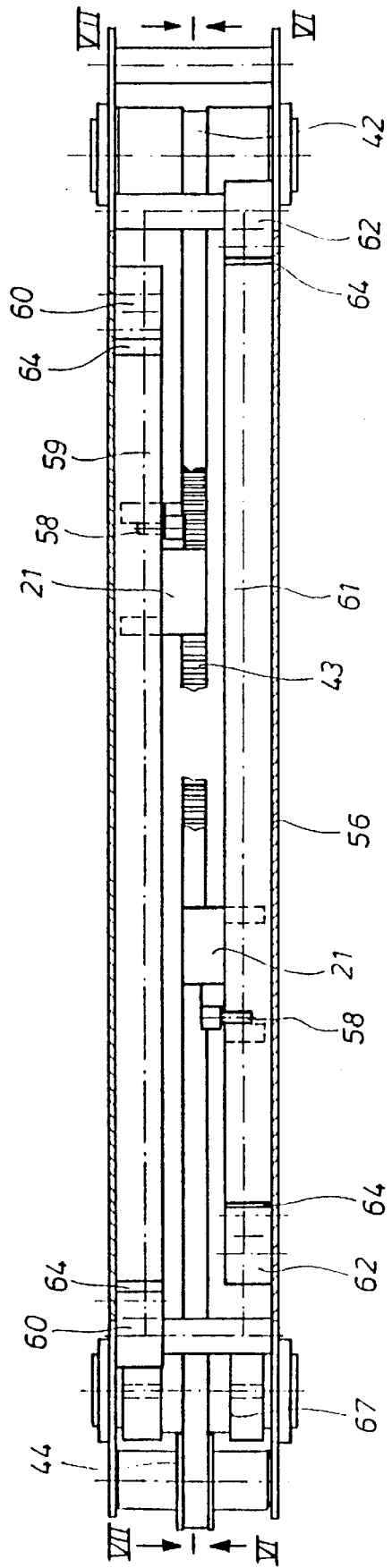
Figure 7:
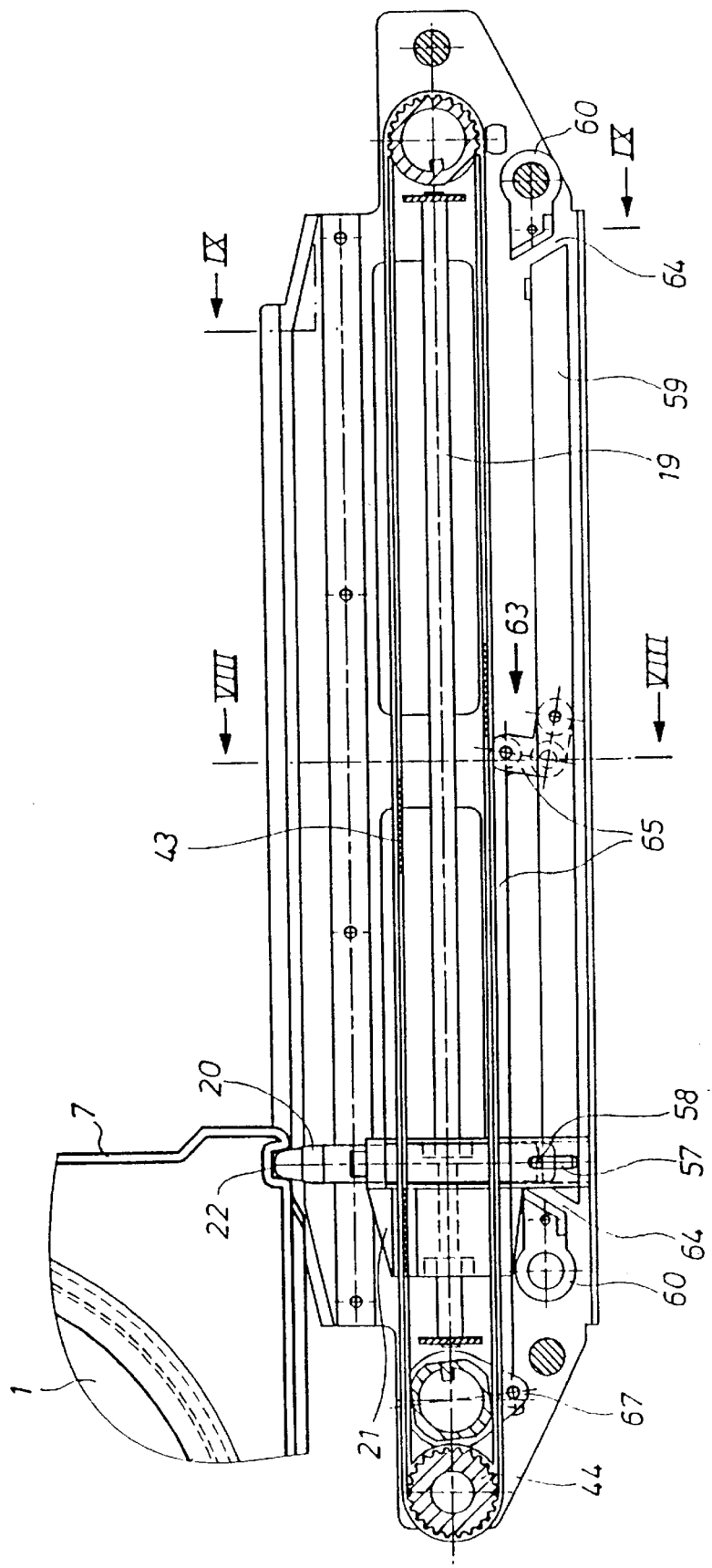

The lever rod assembly 63 connected to the guide bars 59, 61 encompasses an upper lever drive 65 connected to the upper guide bar 59, and a lower lever drive 66 connected to the lower guide bar 61 (FIGS. 5–7). Both of the lever drives 65, 66 are connected to a common switching lever 67, which is seated to be displaceable and fixed against relative rotation on the left, rotatable guide rod 26a of the transport device 10 by means of a groove-spring guide 68. A clamping ring 69 having a protruding catch 70, with which a stationary stop 71 is associated, is disposed at the lower end of the left guide rod 26a (FIG. 4). Moreover, the clamping ring 69 is connected to a restoring spring 72 configured as a tension spring. The catch 70 of the clamping ring 69 is acted upon by the armature 73 of an electromagnet 74. A stop 75 on the other side is associated with the armature 73. By means of the electromagnet 74 and the restoring spring 72, the left guide rod 26a can be twisted in different directions, effecting a corresponding pivoting of the switching lever 67 and therefore a limited parallel movement of the guide bars 59, 61 in opposite directions. In the region of the clamping ring 69, the left guide rod 26a supports an angled lever 75 in a manner fixed against relative rotation, which lever extends into one of two adjacent sensors 76 configured as forked couplers corresponding to the position of the armature 73 of the electromagnet 74, to monitor the end positions in the direction of rotation of the left guide rod 26a. Instead of the torsional drive of the guide rods 26a by means of the electromagnet 74 and the restoring spring 72, a torsional drive can also be employed which encompasses a drive motor 82 coupled with the guide rod 26a (FIG. 4a). In this case, the guide rod 26a is connected in a manner fixed against relative rotation to a tab 106 that correspondingly dips into the sensors 76.

Figure 8:
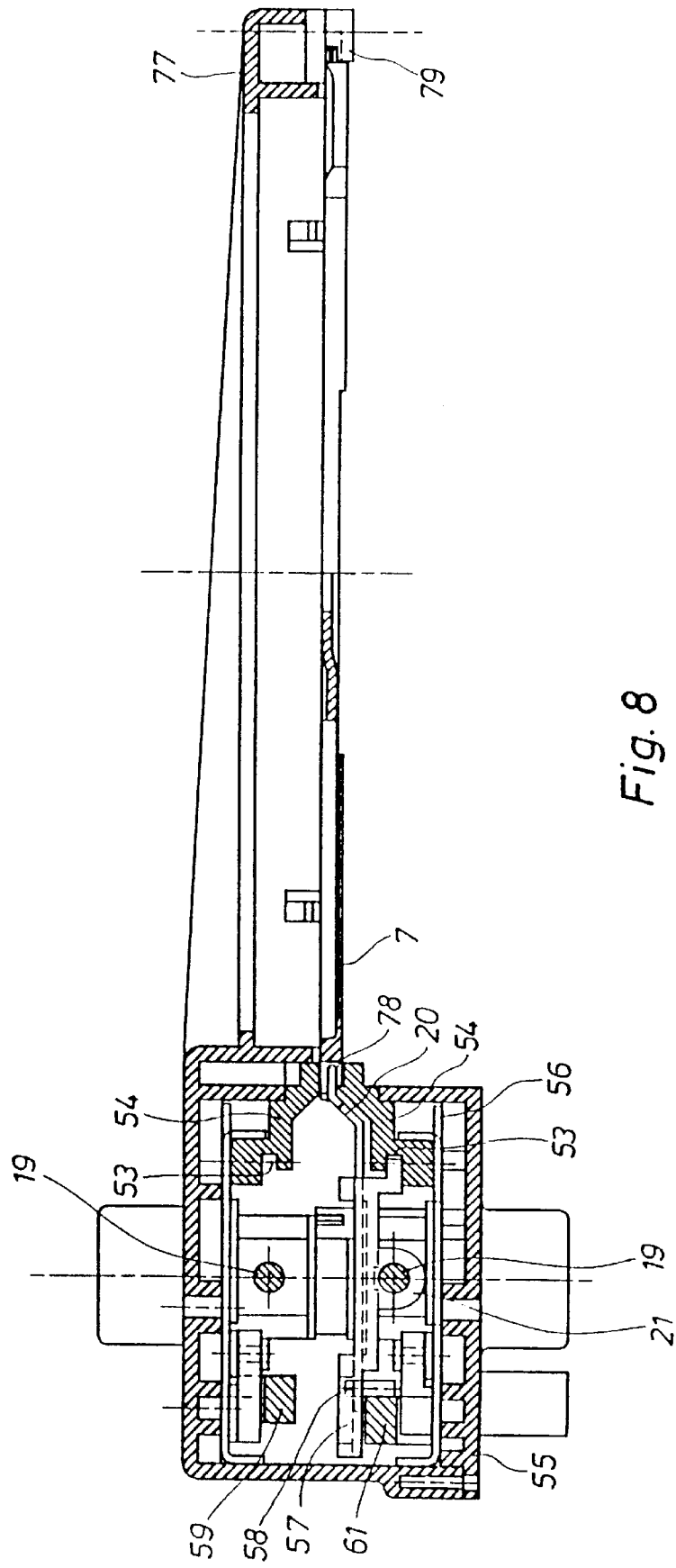
Figure 9:
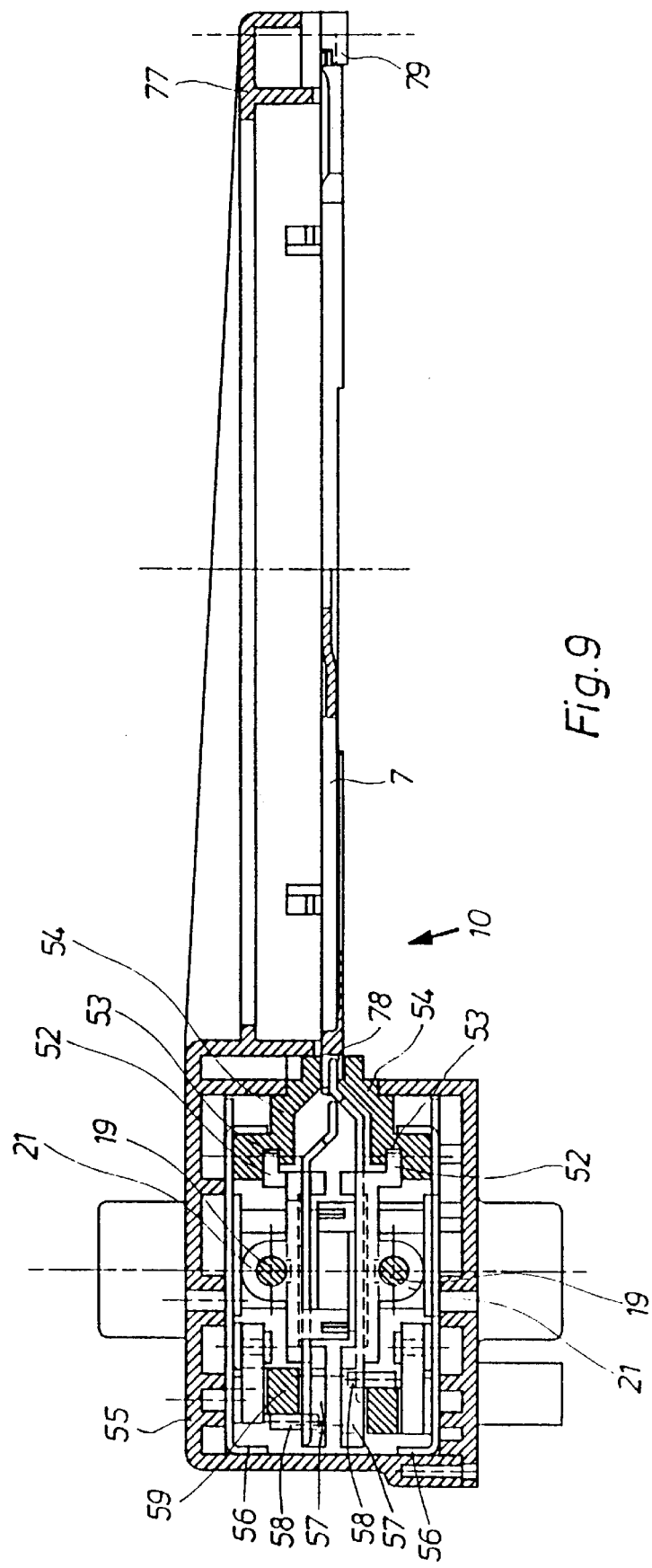

A rectangular bracket 77 for receiving a disc holder 7 is disposed at the housing 55 of the transport device 10 (FIGS. 8 and 9). A guide rail 78 for the disc holder 7 is configured in the inserted parts 54 of the metal chassis 56 of the housing 55 of the transport device 10, which parts comprise sliding plastic. A further guide rail 79 for the disc holder 7, the rail comprising sliding plastic, is located opposite the guide rail 78, on the outside of the bracket 77. In the center, the outside guide rail 79 supports a spring element 109, which extends into a corresponding notch 110 of the disc holder 7 (FIG. 3b). The top side of the bracket 77 is configured as an integrally-closed cover 80 for the disc holder 7 and its associated disc 1 located below (FIG. 3a). The cover 80 provides protection from dust. In the region of the disc 1 received by the disc holder 7, the cover 80 is configured as a transparent plate 81 to permit viewing of the disc 1. The light beam of a stationary sensor, which is configured as a light barrier and serves to ascertain the actual presence of a disc 1 in the disc holder 7, passes through the plate 81.

Figure 10A:
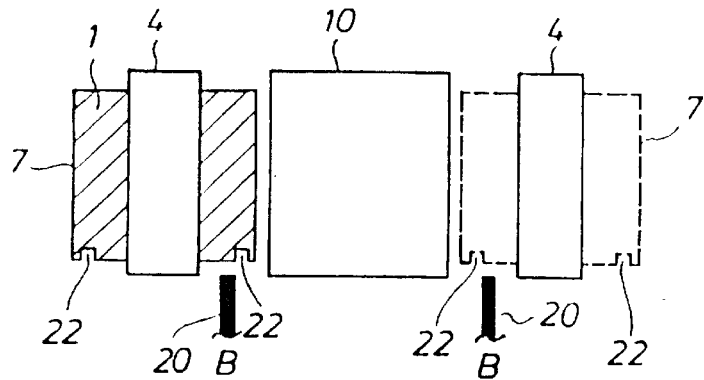
Figure 10B:
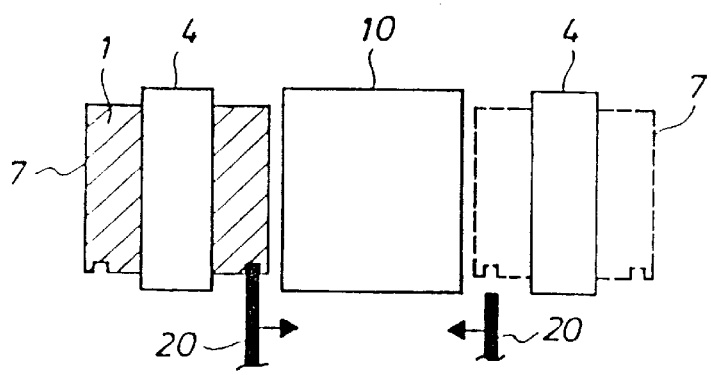
Figure 10C:
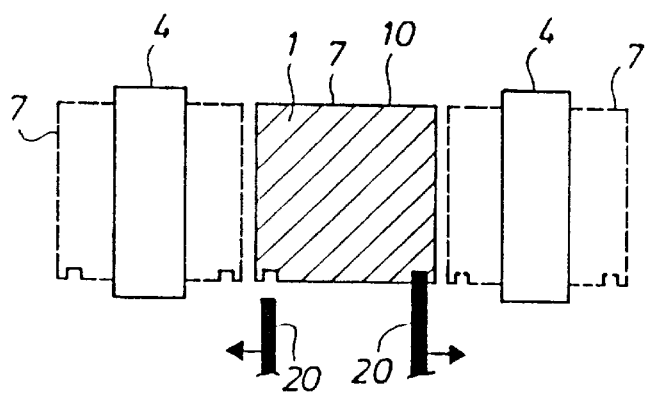
Figure 10D:
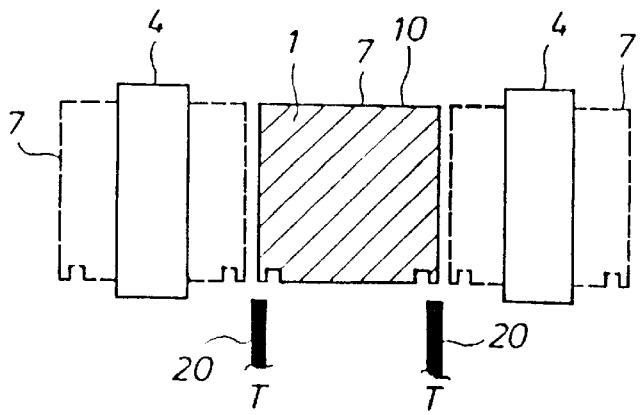
Figure 10:
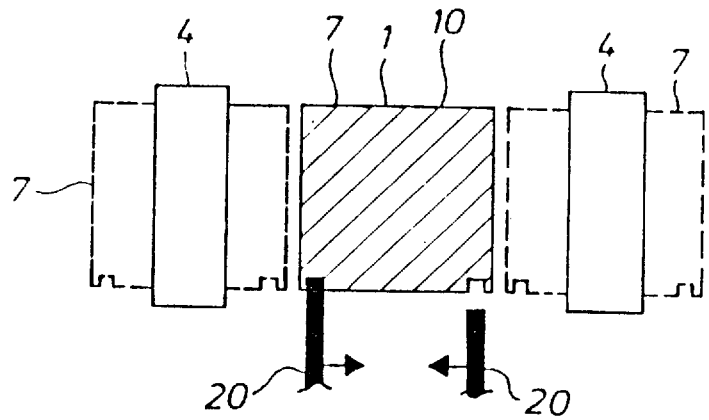
Figure 10:
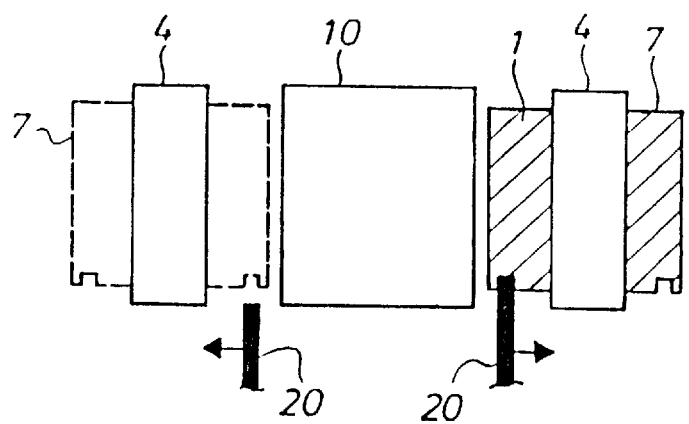
Figure 10:
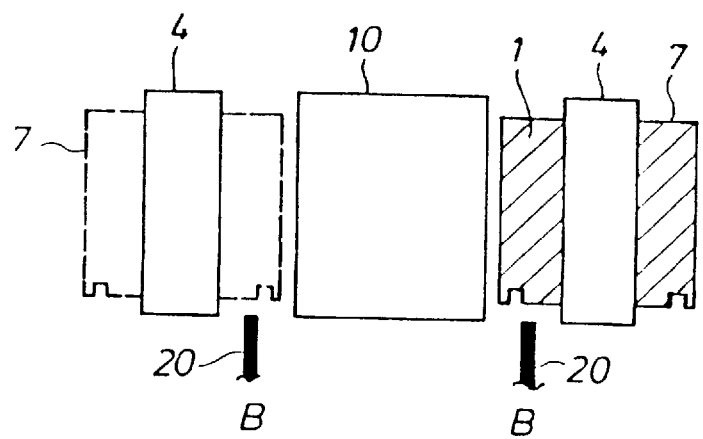

If a disc holder 7 with an inserted disc 1 stored in the right disc magazine 4, for example, are to be conveyed in one plane to the opposite, left disc magazine 4, the transport device 10 travels from its initial position to a height that matches the height of the receiving compartment 6 of the right disc magazine 4 in which the disc holder 7 and disc to be conveyed are located (FIG. 3a). In this position of the transport device 10, the gripper slide elements 20 of the sleds 21 of the extraction devices 9 are located in the ready position (FIG. 10a). The gripper slide element 20 associated with the disc holder 7 and inserted disc 1 is then brought into engagement with the corresponding recess 22 of the disc holder 7 (FIGS. 10b and 3a). The two gripper arms 20 subsequently execute a synchronous movement in opposite directions until the disc holder 7 and disc 1 have reached their end position in the transport device 10 (FIGS. 10c and 3b). The gripper slide element 20 engaging the disc holder 7 is subsequently disengaged from the disc holder 7, so that both gripper slide elements 20 are now located in the transport device position (FIG. 10d). The gripper slide element 20 that did not previously engage the disc holder 7 is now brought from its transport device position into an engaged position with the recess 22 of the disc holder 7 that faces the gripper slide element (FIG. 10e). The gripper slide elements 20 again execute a synchronous, crossing movement in opposite directions until the disc holder 7 and disc 1 have reached their end position in the left disc magazine 4 (FIGS. 10f and 3c). This gripper slide element 20 is then retracted from the disc holder 7, so both gripper slide elements 20 are once again in the ready position for extracting a disc holder 7 from one of disc magazines 4 (FIG. 10g). Correspondingly, the courses of movement in the other possible transport paths of the disc holder 7 and disc 1 proceed in analogous fashion, for example from a disc magazine 4 to a running gear 5 or from the disc loading and issuing slide 11 to a disc magazine.

Figure 11A:
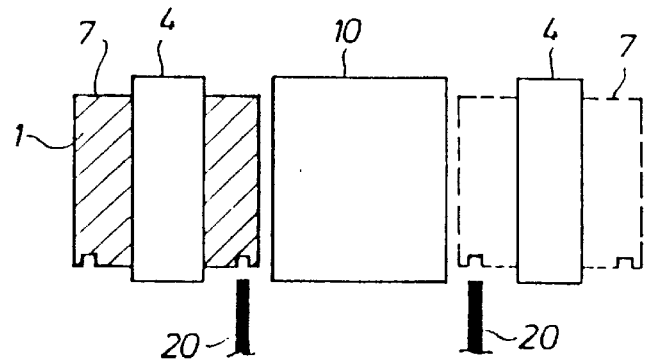
Figure 11B:
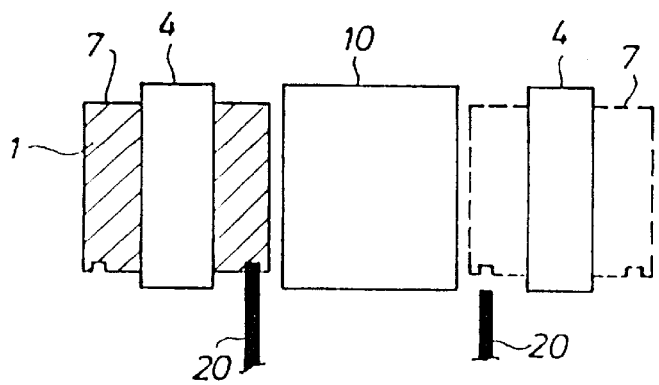

In a corresponding but different structural design of the sliding control element 51, the following sequence of steps is followed when a disc holder 7 with an inserted disc 1 is transferred from the right disc magazine 4 to the left magazine 4: the gripper slide element 20 associated with the right disc magazine 4 is brought out of the ready position (FIG. 11a) and into engagement with the disc holder 7 and associated disc selected in this disc magazine (FIG. 11b).

Figure 11C:
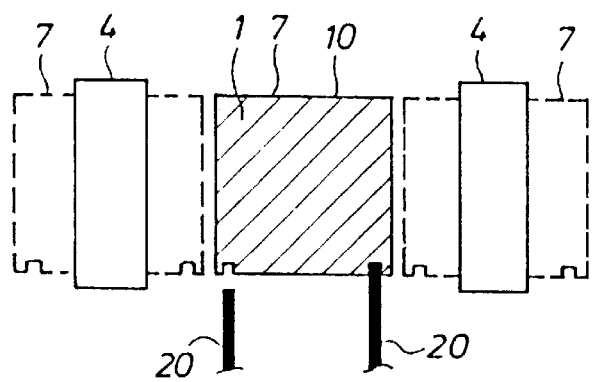
Figure 11D:
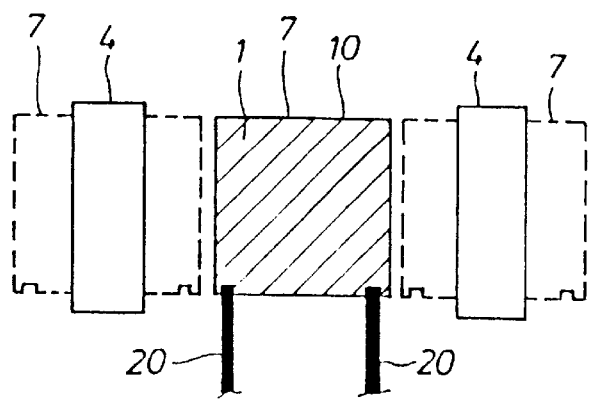
Figure 11E:
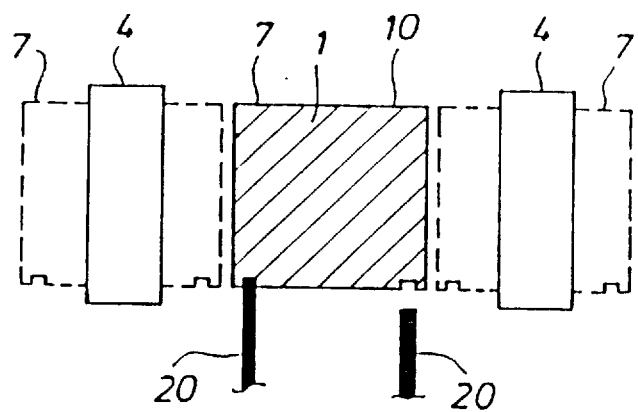
Figure 11F:
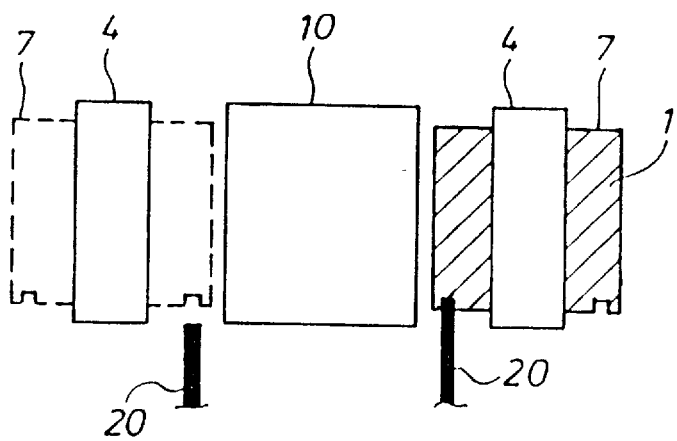
Figure 11G:
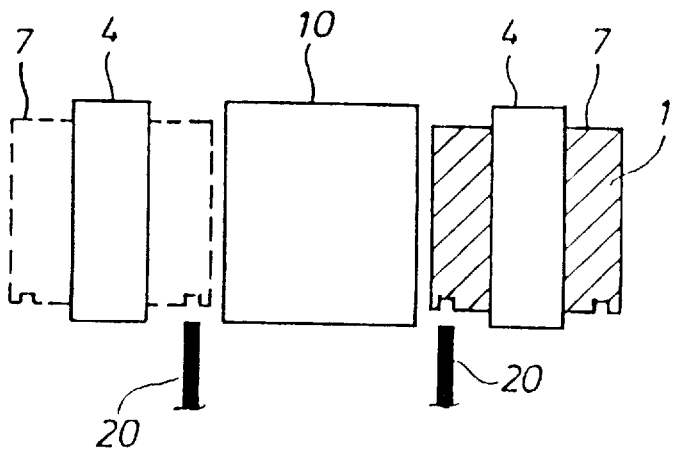

Then the gripper slide elements 20 execute a synchronous movement in opposite directions until the disc holder 7 and disc 1 have reached their end position in the transport device 10 (FIG. 11c). The other gripper slide element 20 previously not in an engaged position is subsequently transferred into an engaged position with the disc holder 7 (FIG. 11d). The gripper slide element 20 that had first been brought into engagement with the disc holder 7 is now disengaged from the disc holder 7 (FIG. 11e). Now the gripper slide elements 20 again execute a crossing movement in opposite directions until the disc holder 7 with the disc 1 has reached its end position in the left disc magazine (FIG. 11f). Then the right gripper slide element 20 is disengaged from the disc holder 7; consequently, both gripper slide elements 20 again assume their ready positions (FIG. 11g). In this case, one gripper slide element 20 always engages the disc holder 7 during transport of the disc holder 7.

Figure 13:
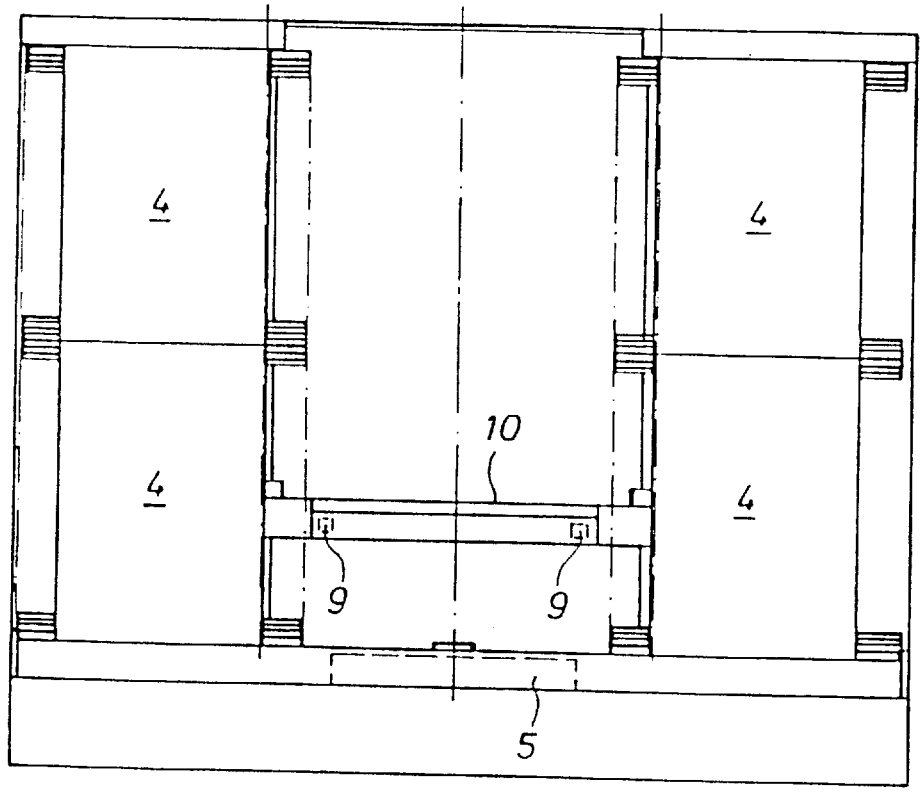
Figure 14:
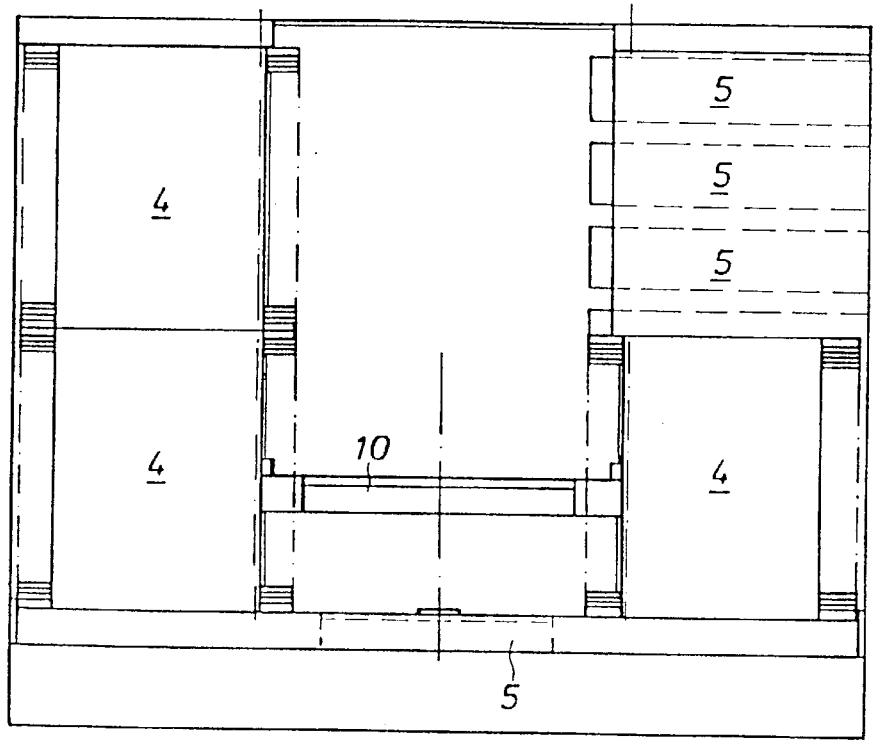
Figure 15:
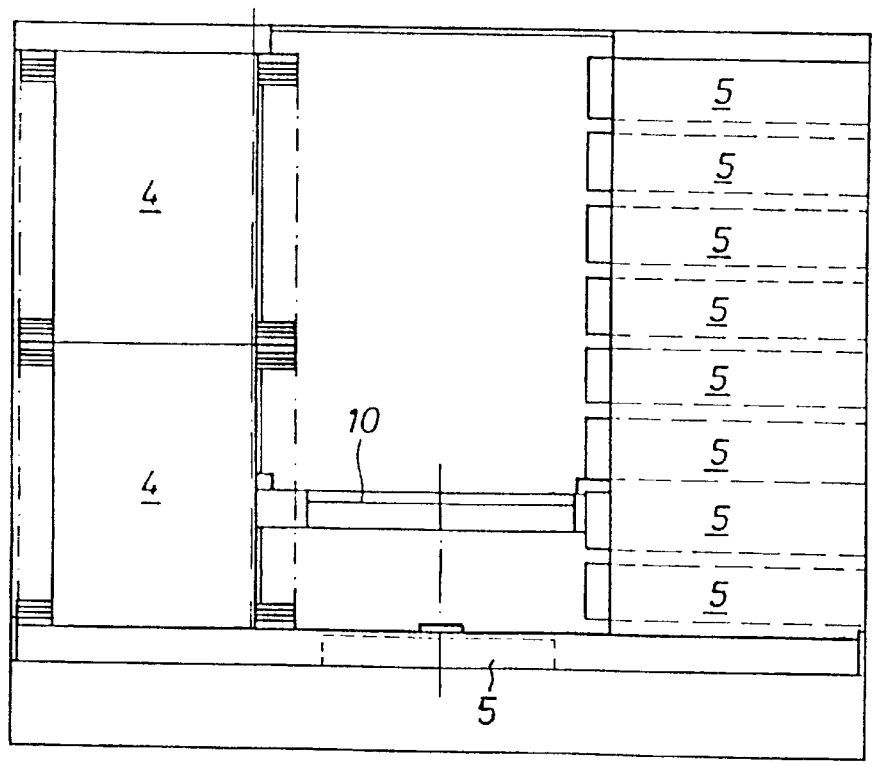

Further embodiments of the fundamental design of the device are illustrated in FIGS. 13 through 15. In the embodiment according to FIG. 13, the device includes two superposed disc magazines 4 to the right and left of the transport device 10, with only one running gear 5 being disposed beneath the transport device 10. In the illustration of FIG. 14, two superposed disc magazines 4 are provided to the left of the transport device 10, and a disc magazine 4 with running gears 5 disposed above it is provided to the right of the transport device 10. A further running gear 5 is disposed beneath the transport device 10. The embodiment according to FIG. 15 essentially corresponds to the embodiment in FIG. 14, except that the disc magazine 4 on the right side is replaced by further running gears 5, that is, a tower comprising superposed running gears 5 and having the same height as the two left-side disc magazines 4 is disposed opposite the disc magazines.

Figure 16:
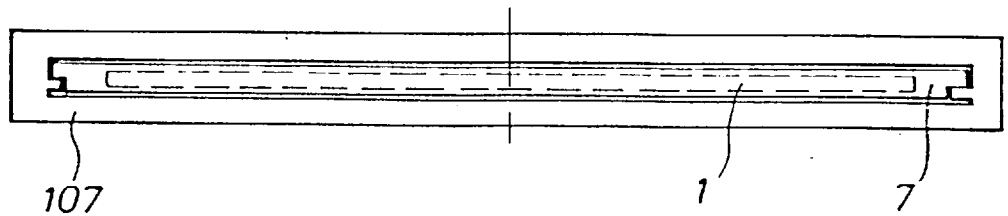
Figure 17:
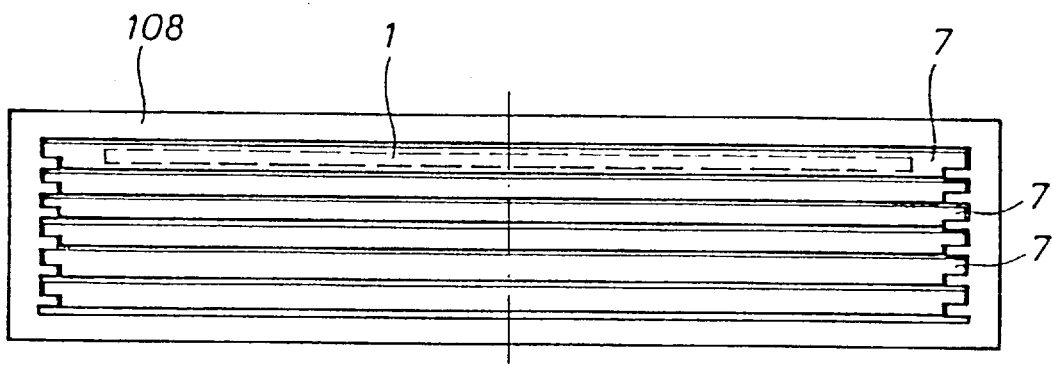

FIG. 16 illustrates a way to store a disc holder 7 with a disc 1. For this purpose, the disc holder 7 and the disc 1 are disposed inside a cassette 107. The cassette 107 is inserted into a correspondingly enlarged receiving compartment 6 of the disc magazine 4. Thus, the disc 1 and disc holder 7 can be easily transported together outside of the device. In the illustration of FIG. 17, a plurality of disc holders 7 with respectively inserted discs 1 is disposed inside a cassette 108.

Figure 19:
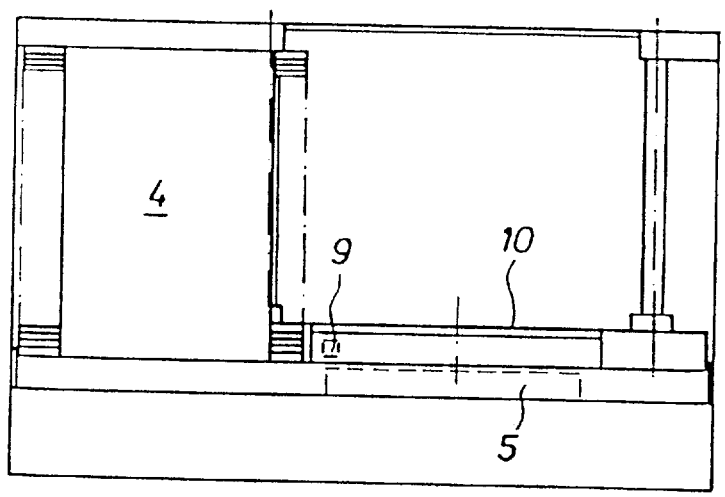
Figure 20:
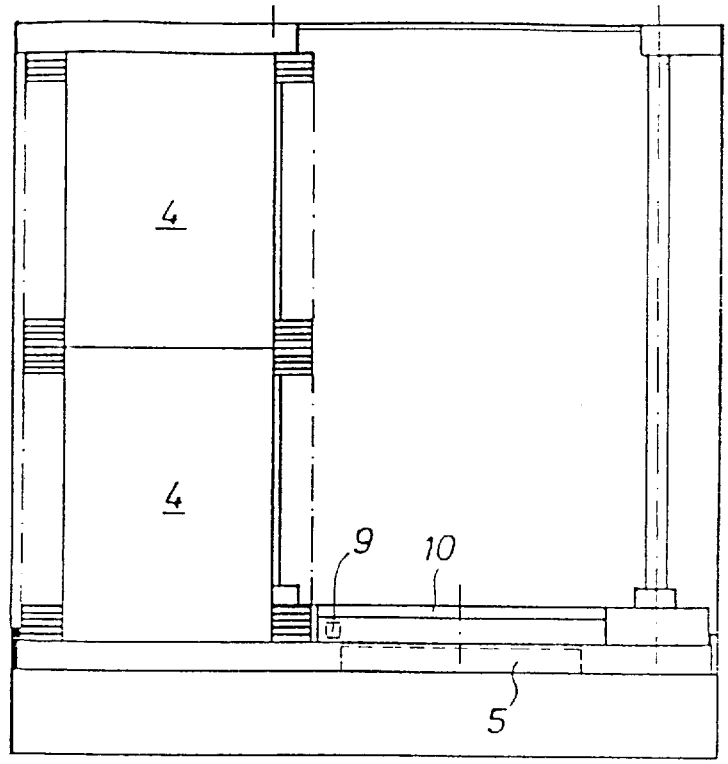
Figure 21:
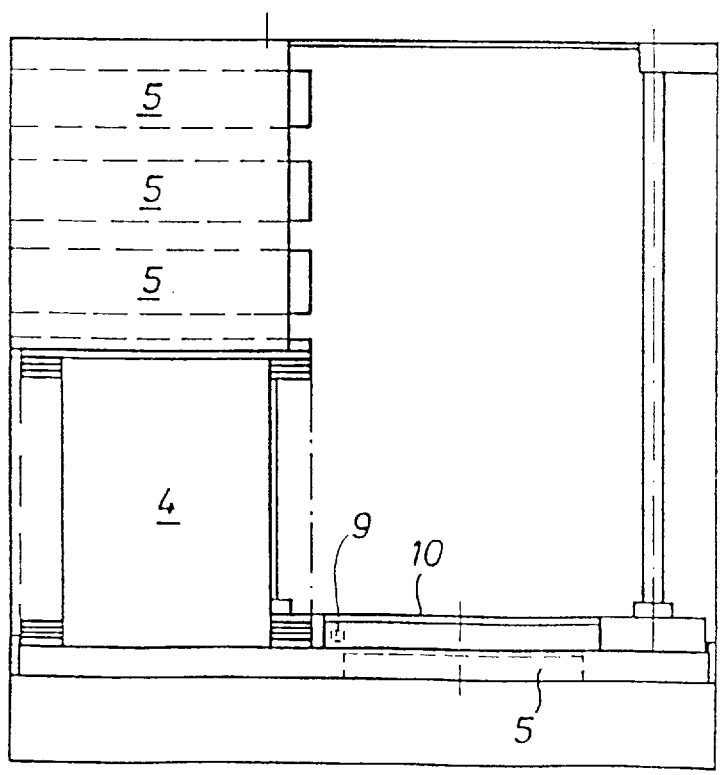

FIGS. 19 through 21 illustrate alternative embodiments of the device in which only one extraction device 9 can travel horizontally on the transport device 10, and one or a plurality of disc magazines 4, one or a plurality of running gears 5 and/or a disc loading and issuing slide on one side of the transport device 10 is associated with this extraction device 9. Moreover, a further running gear 5 can be disposed beneath the transport device 10. In these cases, the torsional drive of the guide rod 26a of the transport device 10 can be omitted, resulting in a significantly simpler overall structure of the control mechanism for the extraction device 9.

We claim:

1. Playing and/or recording and/or issuing device for discs (1) configured as information carriers, particularly CDs, the device having disc magazines (4) that are located opposite one another and receive disc holders (7) for at least one disc (1), the disc holders being located in horizontally-superposed receiving compartments (6), a computer-controlled transport device (10), disposed between the disc magazines (4), for selectively conveying a single disc holder (7), with the disc (1), back and forth between arbitrary receiving compartments (6), between a receiving compartment (6) and at least one running gear (5) for reading out or inputting information from or onto the disc (1), respectively, or between a receiving compartment (6) or running gear (5) and a disc loading and issuing slide (11), and two extraction devices (9) for the disc holders (7), which devices can travel horizontally on the transport device (10), characterized in that the extraction devices (9) can simultaneously move in opposite directions relative to one another, crossing each other between a ready position (FIG. 10a) for extracting a disc holder (7) from the associated disc magazine (4) and a transport device position (FIG. 10d) for extracting a disc holder (7) from the transport device (10), wherein the extraction devices (9) alternatingly located in the ready position and the transport device position are able to be brought into a position in which they engage the disc holder (7).

2. Playing and/or recording and/or issuing device for discs configured as information carriers according to claim 1, characterized in that each extraction device (9) includes a sled (21) that is guided to glide on a horizontal support rod (19) and has an extendable and retractable gripper slide element (20) for a disc holder (7), wherein one sled (21) is secured to a forward belt run (23), and another sled (21) is secured to a rear run (24), of a belt drive (40) or the like coupled to a drive motor (25) whose direction of rotation can be reversed.

3. Playing and/or recording and/or issuing device for discs configured as information carriers according to claim 1, characterized in that the following sequence of steps is performed during the transfer of a disc holder (7) from one disc magazine (4) to the oppositely-located disc magazine (4):

a first extraction device (9) associated with the disc magazine (4) is brought into engagement with the disc holder (7), the first extraction device (9) conveys the disc holder (7) into the transport device (10), wherein, at the end of the transport movement, the first extraction device (9) and a second extraction device (9) assume the transport device position, in which they do not engage the disc holder (7), the second extraction device (9) is brought into engagement with the disc holder (7), and the second extraction device (9) conveys the disc holder (7) out of the transport device (10) and into the other disc magazine (4), wherein, at the end of the transport movement, the two extraction devices (9) assume a ready position, in which they do not engage a disc holder (7) of the associated disc magazine (4) (FIGS. 10a–10g).

4. Playing and/or recording and/or issuing device for discs configured as information carriers according to claim 1, characterized in that the following sequence of steps is performed during the transfer of a disc holder (7) from one disc magazine (4) to the oppositely-located disc magazine (4):

a first extraction device (9) associated with the disc magazines (4) is brought into engagement with the disc holder (7), this first extraction device (9) conveys the disc holder (7) into the transport device (10), wherein, at the end of the transport movement, the first extraction device (9) maintains its engaged position and a second extraction device (9) assumes a transport device position, in which it does not engage the disc holder (7), the second extraction device (9) is brought into engagement with the disc holder (7), the first extraction device (9) is disengaged from the disc holder (7), the second extraction device (9) conveys the disc holder (7) out of the transport device (10) and into the other disc magazine (4), wherein, at the end of the transport movement, the two extraction devices (9) assume a ready position, in which they do not engage a disc holder (7) of the associated disc magazine (4) (FIGS. 11a–11g).

5. Playing and/or recording and/or issuing device for discs configured as information carriers according to claim 1, characterized in that the transport device (10) is seated to glide on two parallel, vertically-extending guide rods (26, 26a) and can be moved up and down by way of a belt drive (29) whose drive motor (36) can reverse its direction of rotation.

6. Playing and/or recording and/or issuing device for discs configured as information carriers according to claim 1, characterized in that the transport device (10) is allocated a sensor (38) for ascertaining a lower initial position of the transport device.

7. Playing and/or recording and/or issuing device for discs configured as information carriers according to claim 1, characterized in that the transport device (10) is allocated a sensor for monitoring the actual presence of a disc (1) in the disc holder (7) located in the transport device (10).

8. Playing and/or recording and/or issuing device for discs configured as information carriers according to claim 1, characterized in that one of two parallel, vertically-extending guide rods (26, 26a) of the transport device (10) is rotatably seated, and the one guide rod (26) is connected by way of a gear (42), which is fixed against relative rotation and is displaceable on the one guide rod, to a toothed belt (43) of a belt drive (40) coupled to sleds (21) in order to convert rotational movement of the one guide rod into a displacement movement of the sleds (21), and the one guide rod is also connected by way of a further belt drive (45) to a drive motor (25) for the sleds (21).

9. Playing and/or recording and/or issuing device for discs configured as information carriers according to claim 1, characterized in that a rotatable guide rod (26) is preferably connected by way of a further belt drive (47) to a rotatable encoding disk (49) that cooperates with sensors (50) that generate position pulses to ascertain the position of the extraction devices (9).

10. Playing and/or recording and/or issuing device for discs configured as information carriers according to claim 1, characterized in that a reversible sliding control element (51) is associated with gripper slide elements (20) of sleds (21) such that, during a movement of the sleds (21) in opposite directions from the ready position, in which the gripper slide elements (20), in their retracted position, are respectively located opposite a recess (22) of a disc holder (7) in the opposite disc magazine (4), or out of the transport device position, in which the gripper slide elements (20), in their retracted position, are respectively located opposite a recess (22) in a disc holder (7) conveyed into the transport device (10), the gripper slide element (20) of one of the sleds (21) is alternatingly forced to be transferred into a position in which it engages the disc holder (7).

11. Playing and/or recording and/or issuing device for discs configured as information carriers according to claim 1, characterized in that gripper slide elements (20) are bent at opposite right angles in their forward region such that, during a crossing movement of sleds (21) in opposite directions, in which one gripper slide element (20) is always in the extended position and another gripper slide element (20) is always in the retracted position, the forward regions of the gripper slide elements (20) pass each other in one plane, and can be brought into engagement with the disc holder (7) in the same plane.

12. Playing and/or recording and/or issuing device for discs configured as information carriers according to claim 1, characterized in that each sled (21) extends so as to glide, with a projecting catch (52), into a guide groove (53), which is configured in an inserted part (54) of a chassis (56) disposed in a housing (55) of the transport device (10), wherein oppositely-located grooves (59) define a same plane of gripper slide elements (20).

13. Playing and/or recording and/or issuing device for discs configured as information carriers according to claim 1, characterized in that a sled (21) is respectively seated on one of two support rods (19) lying one above the other in one plane, and a trunnion (58) guided to glide in an oblong hole (57) of the sled (21) is secured to the end side of gripper slide elements (20) of upper and lower sleds (21), wherein the trunnion (58) of the gripper slide element (20) of the upper sled (21) cooperates with an adjustable, upper guide bar (59) and ramps (60) disposed stationarily at an end of the upper guide bar (59), and wherein the trunnion (58) of the gripper slide element (20) of the lower sled (21) cooperates with an adjustable, lower guide bar (61) and ramps (62) disposed stationarily at an end of the lower guide bar (61).

14. Playing and/or recording and/or issuing device for discs configured as information carriers according to claim 1, characterized in that a ramp (60) associated with a right side of an upper guide bar (59) determines the ready position of a gripper slide element (20) of an upper sled (21) for extracting a disc holder (7) from a right disc magazine (4), and a ramp (62) associated with a left side of a lower guide bar (61) preferably determines the ready position of a gripper slide element (20) of a lower sled (21) for extracting a disc holder (7) from a left disc magazine (4).

15. Playing and/or recording and/or issuing device for discs configured as information carriers according to claim 1, characterized in that a ramp (60) associated with a left side of an upper guide bar (59) determines the transport device position of a disc holder (7) that has been moved out of a right disc magazine (4) in the transport device, and a ramp (62) associated with a right side of a lower guide bar (61) determines the transport device position of a disc holder (7) that has been moved out of a left disc magazine (4) in the transport device (10).

16. Playing and/or recording and/or issuing device for discs configured as information carriers according to claim 1, characterized in that upper and lower guide bars (59, 61) can be moved simultaneously and parallel to each other by way of a driven lever rod assembly (63) in such a way that either the upper or lower guide bar (59, 61) opens through-going slots (64) between the guide bar (59 or 61) and an associated ramp (60 or 62) for the trunnion (58) of gripper slide element (20) of an upper or lower sled (21), respectively.

17. Playing and/or recording and/or issuing device for discs configured as information carriers according to claim 1, characterized in that a lever rod assembly (63) connected to guide bars (59, 61) encompasses an upper lever drive (65) connected to the upper guide bar (59), and a lower lever drive (66) connected to the lower guide bar (61), both of which are connected to a common switching lever (67) such that the guide bars (59, 61) execute a limited, parallel movement in opposite directions when the switching lever (67) is actuated.

18. Playing and/or recording and/or issuing device for discs configured as information carriers according to claim 1, characterized in that throughgoing slots (64) are configured to transfer a gripper slide element (20) of an associated sled (21) into an engaged position or a non-engaged position with respect to the disc holder (7) by correspondingly guiding a trunnion (58) of the gripper slide element (20) as a function of a direction of movement of a belt drive (40) of sleds (21).

19. Playing and/or recording and/or issuing device for discs configured as information carriers according to claim 1, characterized in that, in the engaged position of a gripper slide element (20) of an upper sled (21), a trunnion (58) of the gripper slide element (20) glides on the inside of an upper guide bar (59) during a movement of a belt drive (40) of sleds (21) and, at the same time, a trunnion (58) of a gripper slide element (20) of a lower sled (21), which element is not in the engaged position, glides along the outside of a lower guide bar (61).

20. Playing and/or recording and/or issuing device for discs configured as information carriers according to claim 1, characterized in that, in the engaged position of a gripper slide element (20) of a lower sled (21), a trunnion (58) of the gripper slide element (20) glides on the inside of a lower guide bar (61) during a movement of a belt drive (40) of sleds (21) and, at the same time, a trunnion (58) of a gripper slide element (20) of an upper sled (21), which element is not in the engaged position, glides along the outside of an upper guide bar (59).

21. Playing and/or recording and/or issuing device for discs configured as information carriers according to claim 1, characterized in that a switching lever (67) is disposed to be fixed against relative rotation and displaceable on a rotatably-seated guide rod (26a) of the transport device (10), wherein the guide rod (26a) can be acted upon by way of an electromagnet (74) and a restoring spring (72) that cooperate with a clamping ring (69) disposed to be fixed against relative rotation on the guide rod (26a), or the guide rod (26a) can be acted upon in different directions of rotation by a drive motor (82) whose direction of rotation can be reversed.

22. Playing and/or recording and/or issuing device for discs configured as information carriers according to claim 1, characterized in that sensors (76) for monitoring end positions in the direction of rotation of a guide rod (26a) that receives a switching lever (67) are associated with the guide rod (26a).

23. Playing and/or recording and/or issuing device for discs configured as information carriers according to claim 1, characterized in that a housing (55) of the transport device (10) has a bracket (77), wherein a first guide rail (78) for the disc holder (7) is configured in inserted parts (54) of a metal chassis (56) disposed in the housing (55), which parts comprise sliding plastic, and a second guide rail (79) for the disc holder (7), the second guide rail (79) comprising sliding plastic, is located opposite the first guide rail (78) on the outside of the bracket (77).

24. Playing and/or recording and/or issuing device for discs configured as information carriers according to claim 1, characterized in that a spring element (109) is associated with the center of an outside guide rail (79) of a bracket (77), wherein a spring element centers the disc holder (7) in the transport device (10) by latching in a corresponding notch (110) of the disc holder (7).

25. Playing and/or recording and/or issuing device for discs configured as information carriers according to claim 1, characterized in that actuation of control mechanisms for sleds (21) and gripper slide elements (20), the mechanisms being located in the transport device (10), is effected inside the transport device (10) without electrical drive elements.

26. Playing and/or recording and/or issuing device for discs configured as information carriers according to claim 1, characterized in that each disc holder (7) is positioned securely in the receiving compartment (6) by two oppositely-located spring elements (8) attached to the disc magazine (4), in which position the disc holder (7) can be grasped by the associated extraction device (9) of the transport device (10) by way of a corresponding opening in the side wall of the associated disc magazine (4).

27. Playing and/or recording and/or issuing device for discs configured as information carriers according to claim 1, characterized in that free space between the disc holders (7) in each disc magazine (4) is smaller than the thickness of a disc (1).

28. Playing and/or recording and/or issuing device for discs configured as information carriers according to claim 1, characterized in that the thickness of each disc holder (7) is preferably only slightly greater than the thickness of a disc (1).

29. Playing and/or recording and/or issuing device for discs configured as information carriers according to claim 1, characterized in that the disc holder (7) has a recess (22) in the forward region of each longitudinal side and, corresponding to the position of the disc holder (7) in the receiving compartment (6) of the respective disc magazine (4) or in the transport device (10), a gripper slide element (20) of the corresponding extraction device (9) can be brought into engagement with one of the recesses (22).

30. Playing and/or recording and/or issuing device for discs configured as information carriers according to claim 1, characterized in that notches (105) that align with corresponding recesses (22) in the disc holder (7) in the disc magazine (4) are provided in a bottom wall (104) and a top wall (108) of each disc magazine.

31. Playing and/or recording and/or issuing device for discs configured as information carriers according to claim 1, characterized in that a plurality of running gears (5) is superposed to be exchangeable in the vertical axis of one of the disc magazines (4).

32. Playing and/or recording and/or issuing device for discs configured as information carriers according to claim 1, characterized in that a running gear (5) is disposed beneath the transport device (10).

33. Playing and/or recording and/or issuing device for discs configured as information carriers according to claim 1, characterized in that a running gear (5) is disposed beneath the transport device, and a plurality of running gears (5) is disposed in the vertical axis of one of the disc magazines (4).

34. Playing and/or recording and/or issuing device for discs configured as information carriers according to claim 1, characterized in that one of the oppositely-located disc magazines (4) is completely replaced by a tower of superposed running gears (5).

35. Playing and/or recording and/or issuing device for discs configured as information carriers according to claim 1, characterized in that one of the oppositely-located disc magazines (4) is completely replaced by a tower of superposed running gears (5), and a further running gear (5) is disposed beneath the transport device (10).

36. Playing and/or recording and/or issuing device for discs configured as information carriers according to claim 1, characterized in that a disc loading and issuing slide (11) is disposed to be exchangeable in the vertical axis of one of the disc magazines (4), and an insertion and ejection shaft (12) for a disc holder (7) with a disc (1) is associated with the slide (11), wherein either the transport device (10) conveys the disc holder (7) and the disc (1) to one of the running gears (5) or a free receiving compartment (6) via the disc loading and issuing slide (11), or a disc (1) located in a disc magazine (4) can be exchanged for another disc (1).

37. Playing and/or recording and/or issuing device for discs configured as information carriers according to claim 1, characterized in that the disc holder (7) is compelled to remain in a disc loading and issuing slide (11) while a disc (1) is being issued or exchanged for another disc (1) by the disc loading and issuing slide (11) while it is in an extended position.

38. Playing and/or recording and/or issuing device for discs configured as information carriers according to claim 1, characterized in that the disc holder (7) and the disc (1) are disposed inside a cassette (107) inserted into a correspondingly enlarged receiving compartment (6) of the disc magazine (4).

39. Playing and/or recording and/or issuing device for discs configured as information carriers according to claim 1, characterized in that a plurality of disc holders (7) and their respective discs (1) are disposed inside a cassette (108), which is then inserted into a correspondingly enlarged receiving compartment (6) of the disc magazine (4).

40. Playing and/or recording and/or issuing device for discs configured as information carriers according to claim 1, characterized in that an intermediate memory (101) is associated with an internal computer unit (13), and an external computer is provided, wherein the internal computer unit (13) controls and monitors the device, manages the intermediate memory (101) and effects communication with the external computer.

41. Playing and/or recording and/or issuing device for discs configured as information carriers according to claim 1, characterized in that only one disc magazine (4) is associated with one side of the transport device (10), and a running gear (5) is disposed either in the vertical axis of the one disc magazine (4) or beneath the transport device (10), wherein only one extraction device (9) that can travel horizontally on the transport device is disposed thereupon.

42. Playing and/or recording and/or issuing device for discs configured as information carriers according to claim 1, characterized in that a plurality of superposed disc magazines (4), a plurality of superposed running gears (5) and a disc loading and issuing slide are associated with one side of the transport device (10).

* * * * *